(12) United States Patent
Sung

(10) Patent No.: US 9,191,644 B2
(45) Date of Patent: Nov. 17, 2015

(54) MOBILE TERMINAL AND 3D IMAGE CONTROLLING METHOD THEREIN

(75) Inventor: Changhoon Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 1324 days.

(21) Appl. No.: 12/987,785

(22) Filed: Jan. 10, 2011

(65) Prior Publication Data

US 2012/0007953 A1    Jan. 12, 2012

(30) Foreign Application Priority Data

Jul. 12, 2010 (KR) ........................ 10-2010-0066807

(51) Int. Cl.
 *H04N 7/18* (2006.01)
 *H04N 13/00* (2006.01)
 *H04N 13/02* (2006.01)
 *H04N 13/04* (2006.01)

(52) U.S. Cl.
 CPC ....... *H04N 13/0033* (2013.01); *H04N 13/0018* (2013.01); *H04N 13/0022* (2013.01); *H04N 13/0239* (2013.01); *H04N 13/0404* (2013.01); *H04N 13/0409* (2013.01); *H04N 13/0434* (2013.01); *H04N 13/0438* (2013.01)

(58) Field of Classification Search
 CPC .......... H04N 13/0497; H04N 13/0404; H04N 13/0409
 USPC ..................................... 348/36–60
 See application file for complete search history.

(56) References Cited

U.S. PATENT DOCUMENTS

| | | | |
|---|---|---|---|
| 2006/0104483 | A1 | 5/2006 | Harel et al. |
| 2007/0139612 | A1 | 6/2007 | Butler-Smith et al. |
| 2008/0199046 | A1 | 8/2008 | Sasagawa et al. |
| 2008/0253683 | A1 | 10/2008 | Nakamura et al. |
| 2010/0194860 | A1* | 8/2010 | Mentz et al. ............... 348/47 |

FOREIGN PATENT DOCUMENTS

| | | |
|---|---|---|
| CN | 1774937 A | 5/2008 |
| CN | 101184252 A | 5/2008 |
| EP | 1085769 A2 | 3/2001 |
| EP | 1919225 A1 | 5/2008 |

* cited by examiner

*Primary Examiner* — Andy Rao
(74) *Attorney, Agent, or Firm* — Birch, Stewart, Kolasch & Birch, LLP

(57) ABSTRACT

A mobile terminal and 3D image controlling method therein are provided, by which a user can be informed of a state of a 3D effect on one or more objects in a 3D image. The mobile terminal includes a first camera configured to capture a left-eye image for generating a 3D image, a second camera configured to capture a right-eye image for generating the 3D image, a display unit configured to display the 3D image generated based on the left-eye image and the right-eye image, and a controller configured to determine an extent of a 3D effect on at least one object included in the 3D image, and to control the display unit to display information indicating the determined extent of the 3D effect.

21 Claims, 30 Drawing Sheets

FIG. 5
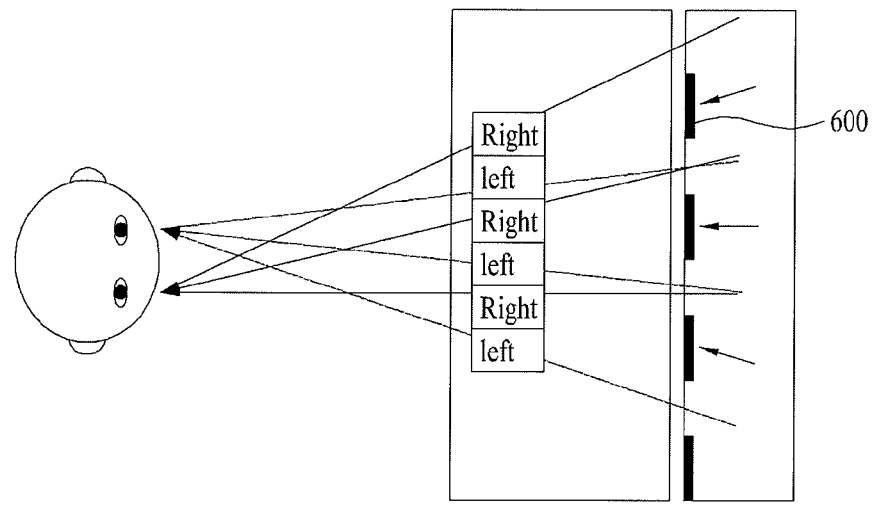
(a)
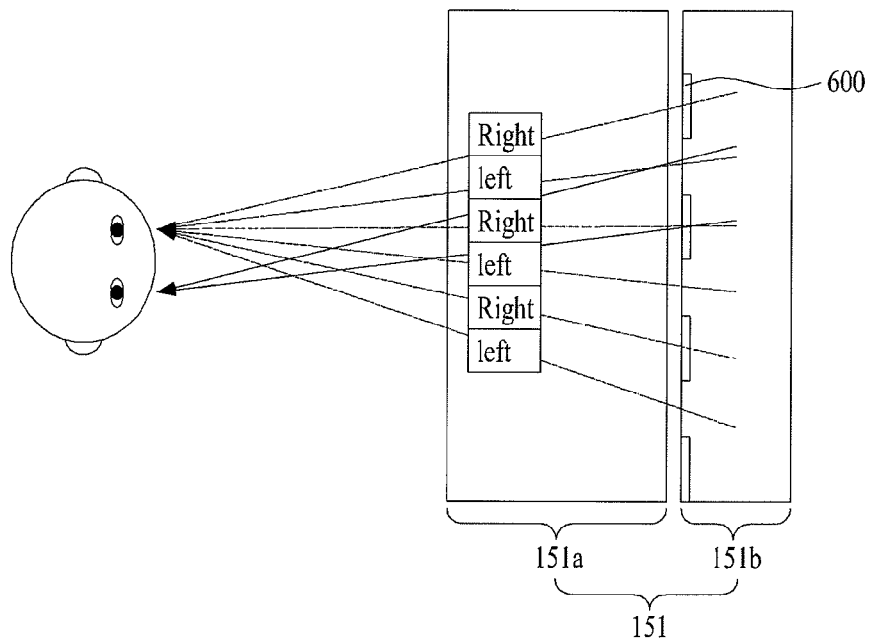
(b)

FIG. 10
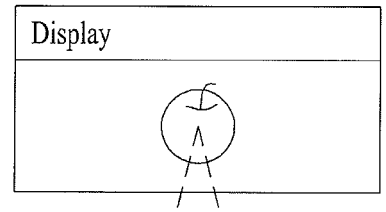
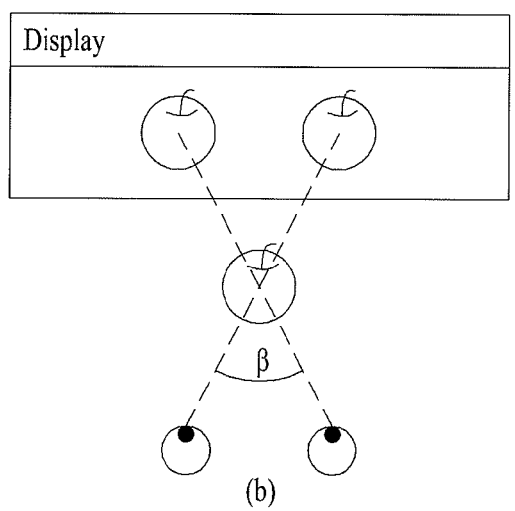
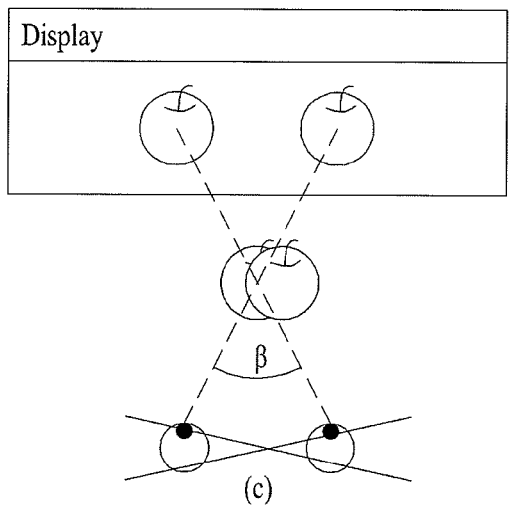

FIG. 11
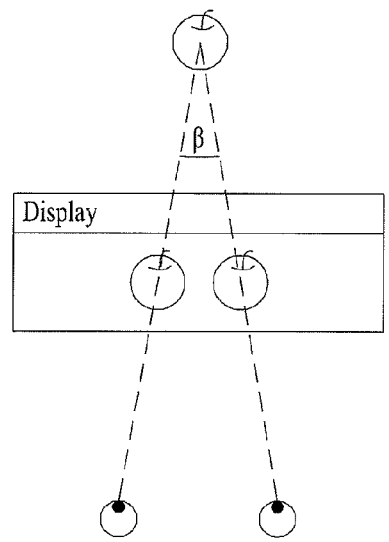
Normal long-distance focus
(a)
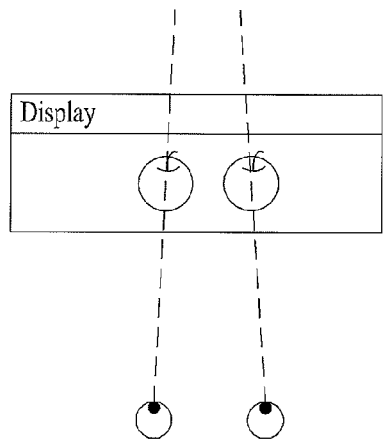    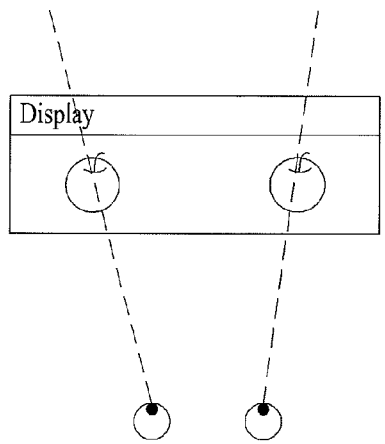
Limit parallax (1)                          Limit parallax (2)
Relative parallax is smaller than limit parallax.   Parallax is output of eye gap.
(Occurring in case of a short viewing distance)    (Occurring in case of a large-scale display)
(b)                                          (c)

FIG. 12
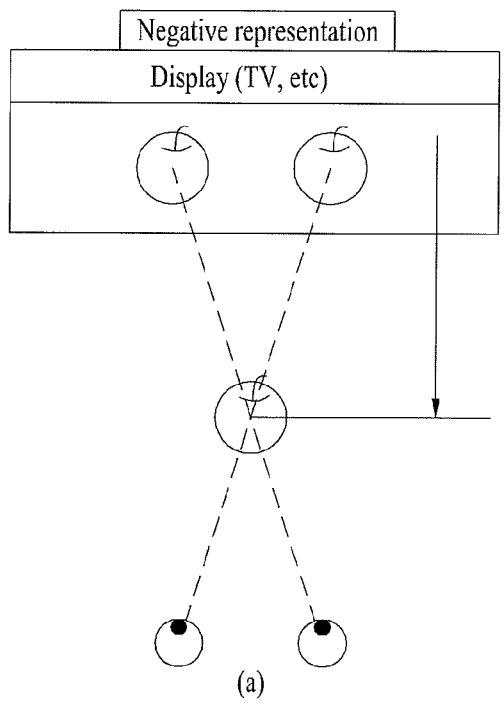
(a)
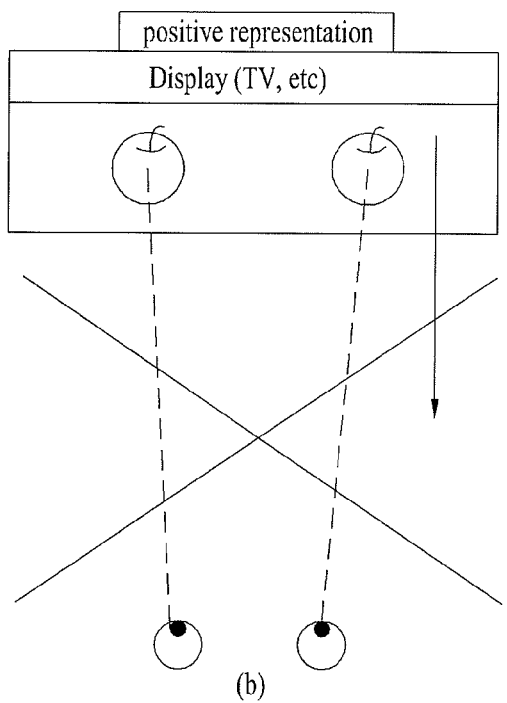
(b)

FIG. 13
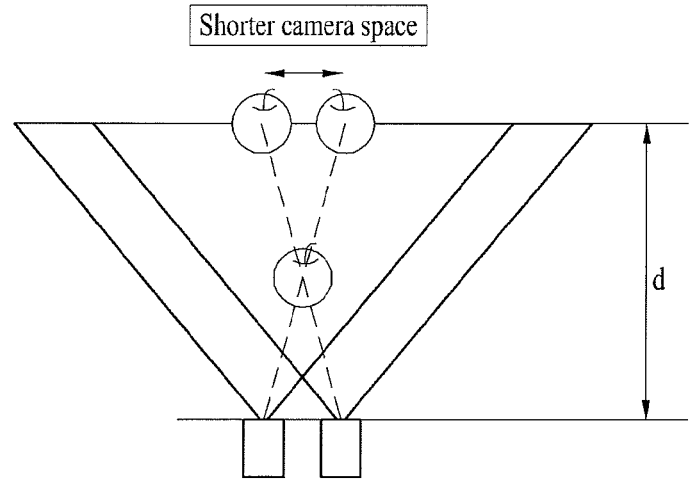
(a)
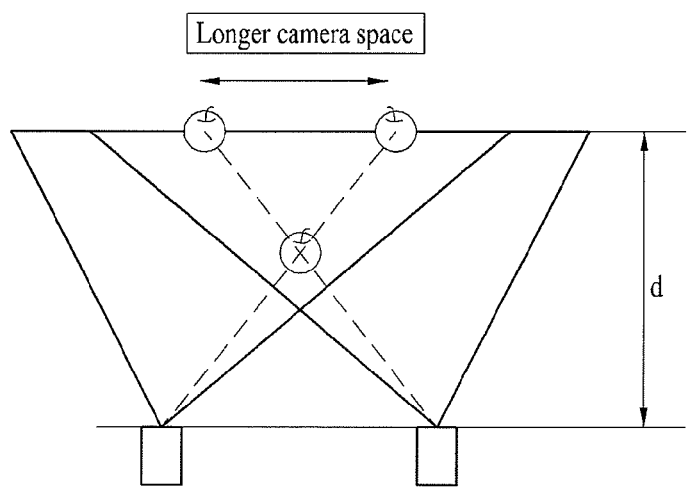
(b)

FIG. 16
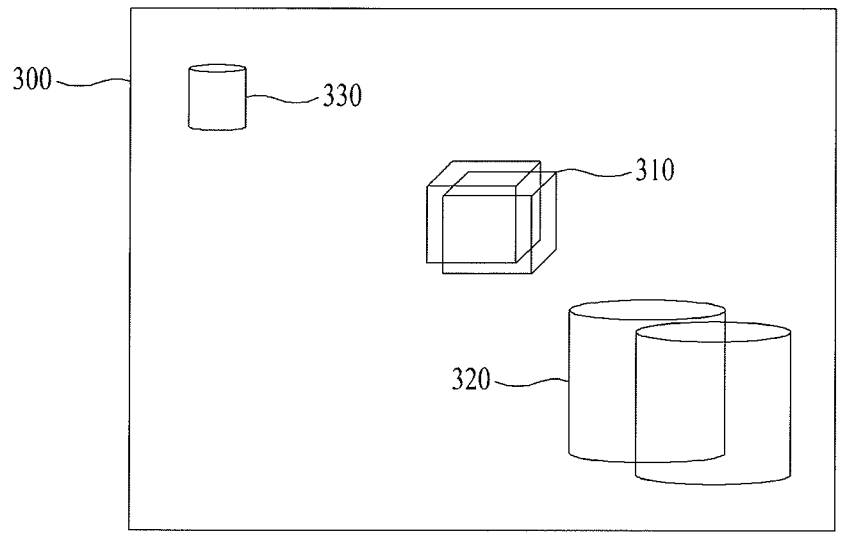
(a)
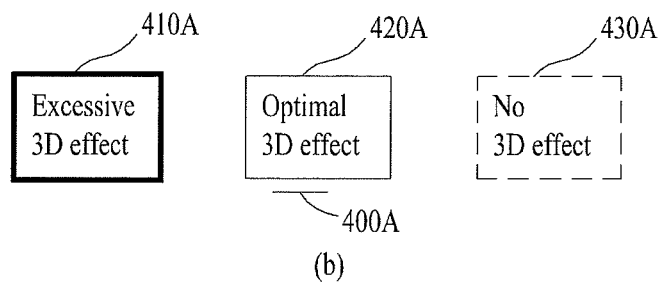
(b)
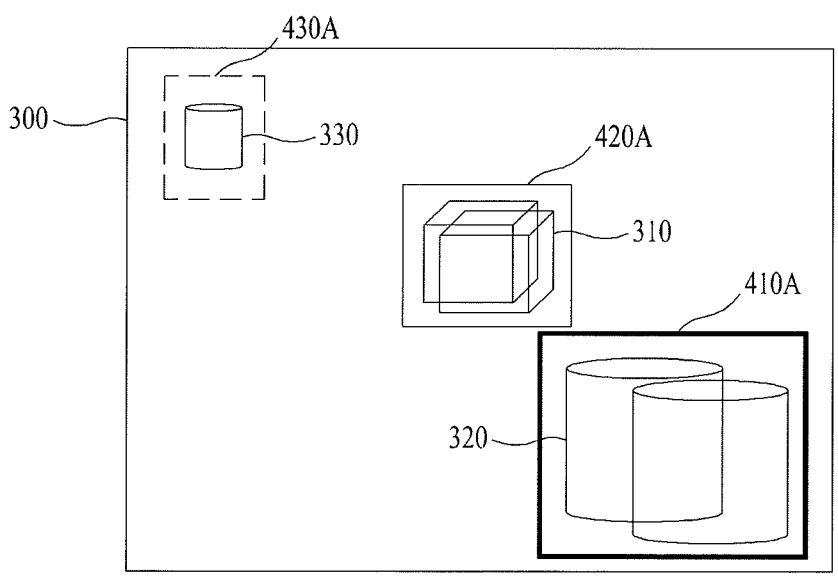
(c)

FIG. 17
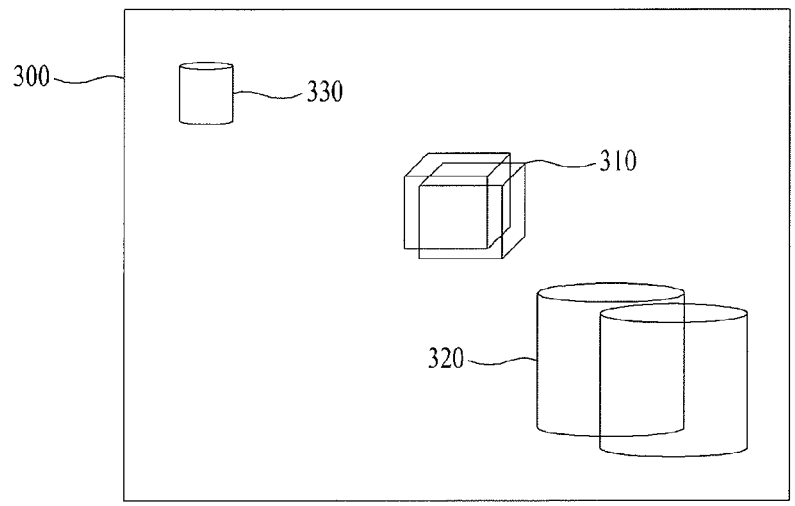
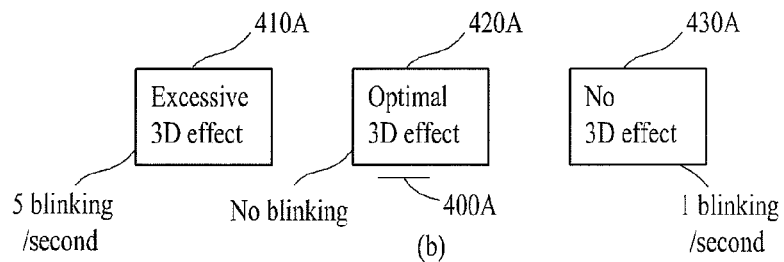
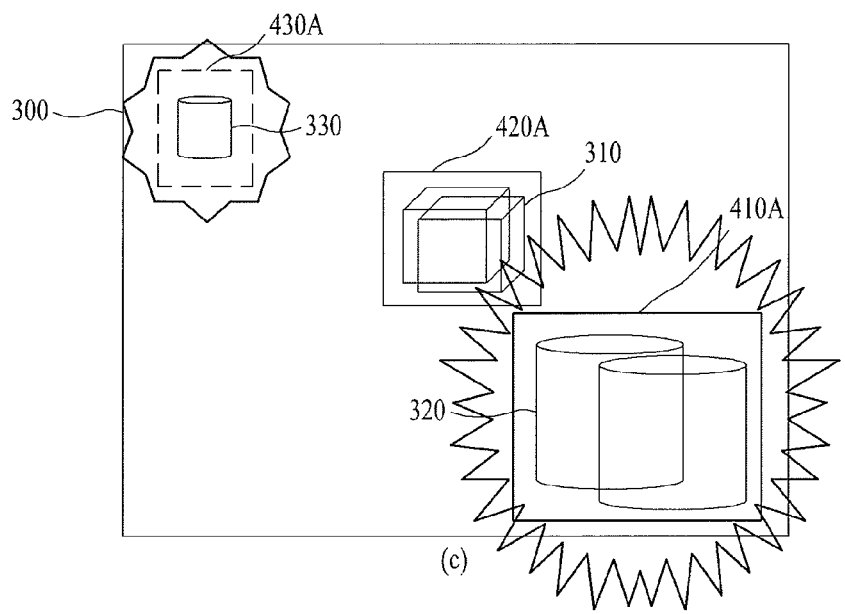

FIG. 18
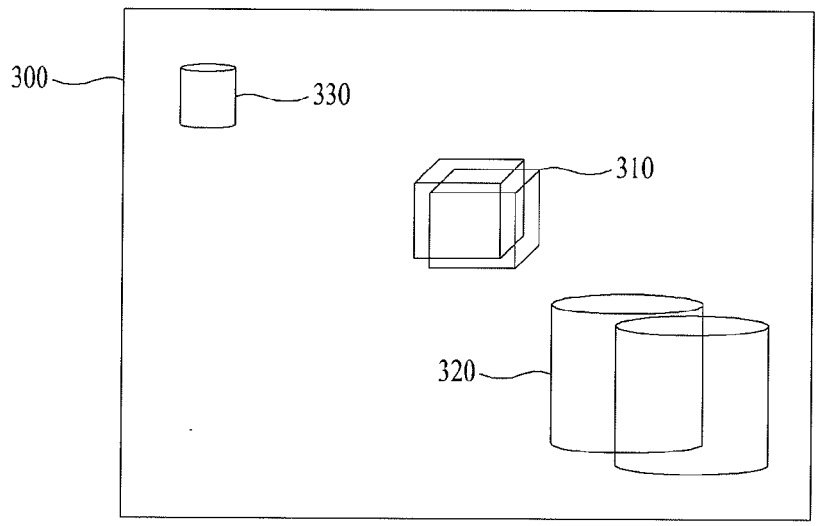
(a)
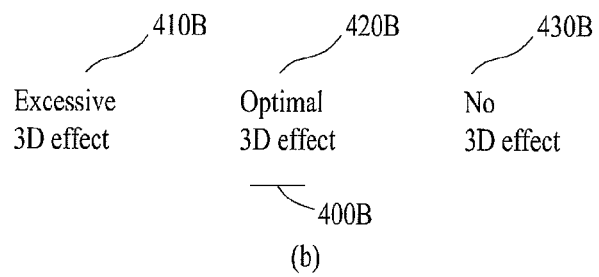
(b)
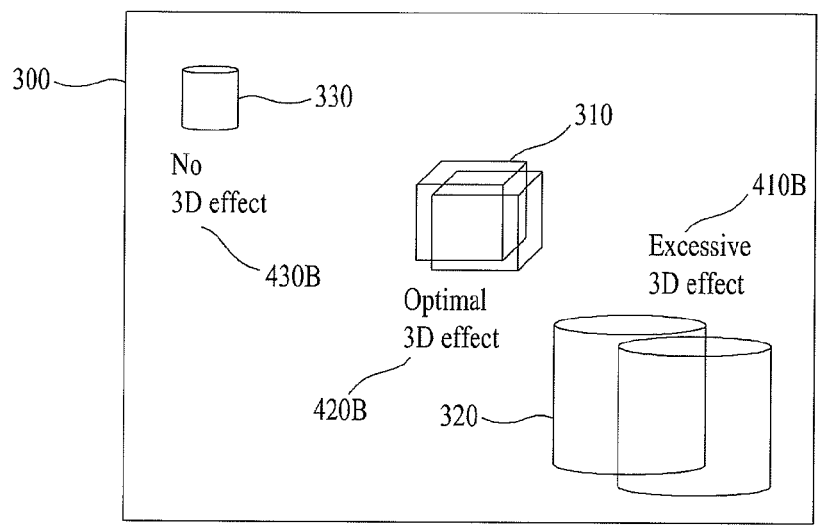
(c)

FIG. 19
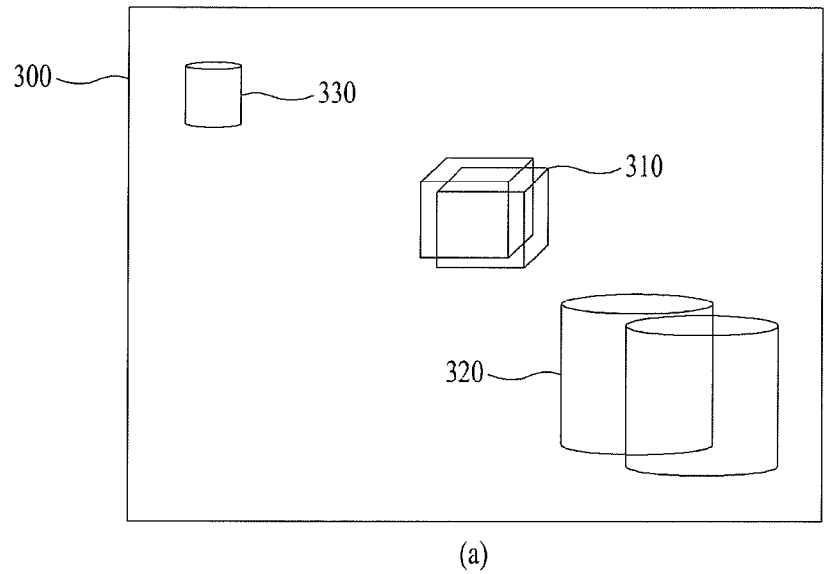
(a)
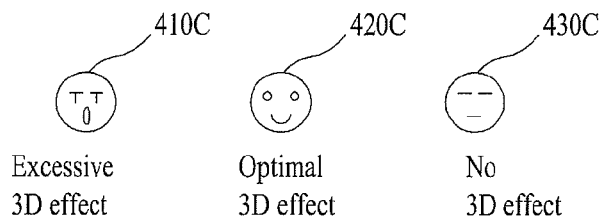
(b)
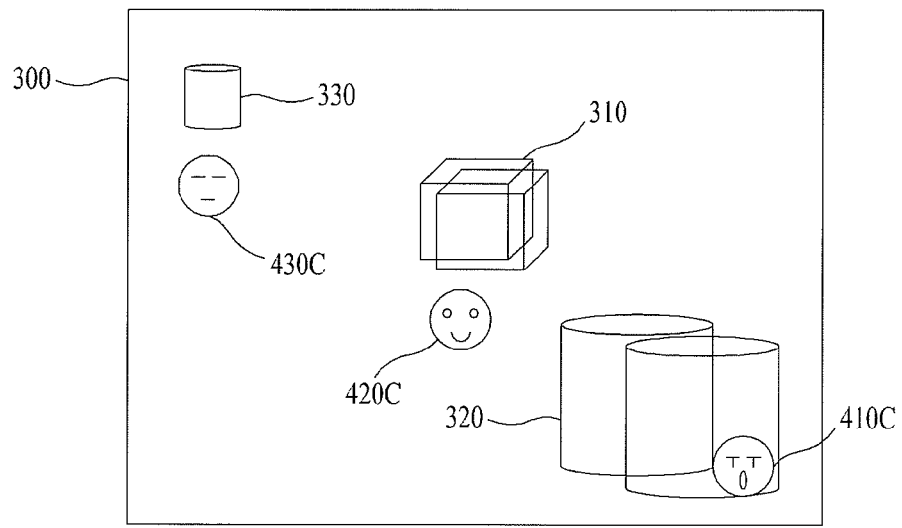
(c)

FIG. 20
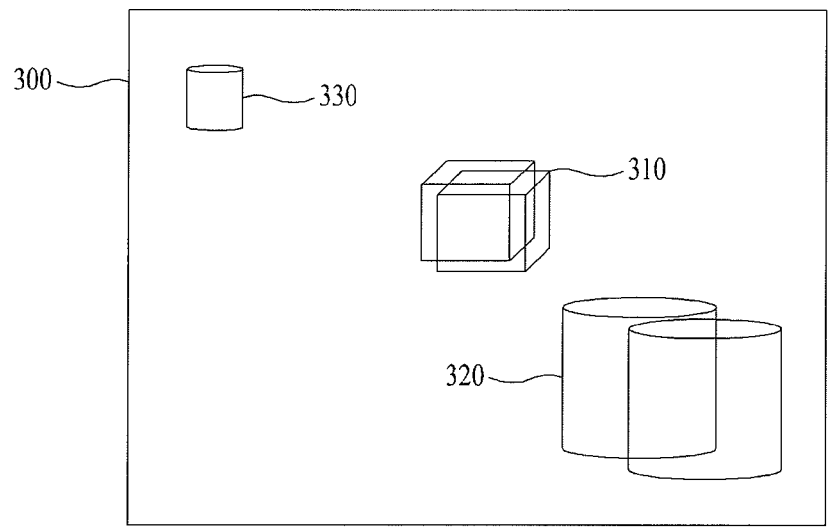
(a)
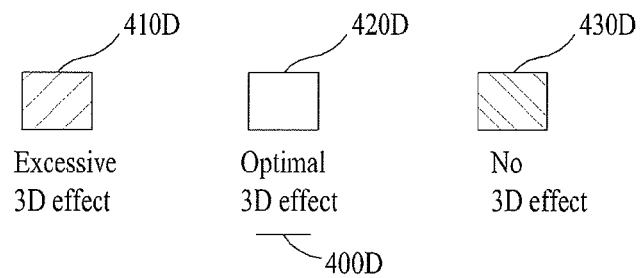
(b)
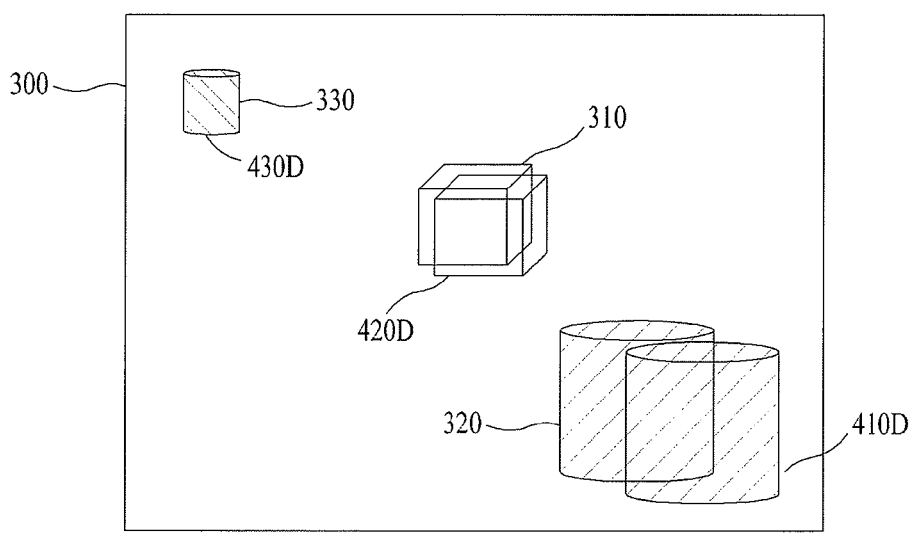
(c)

FIG. 21
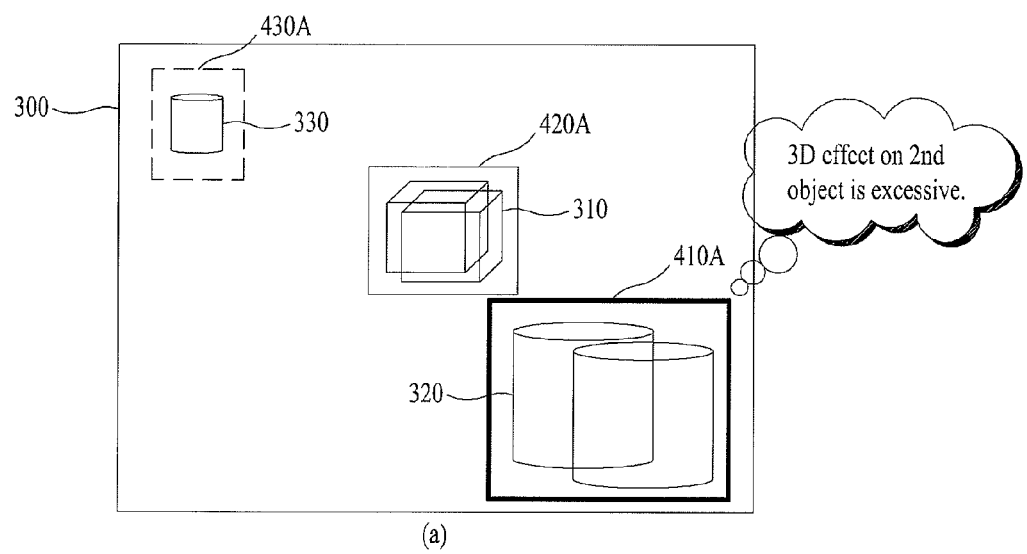
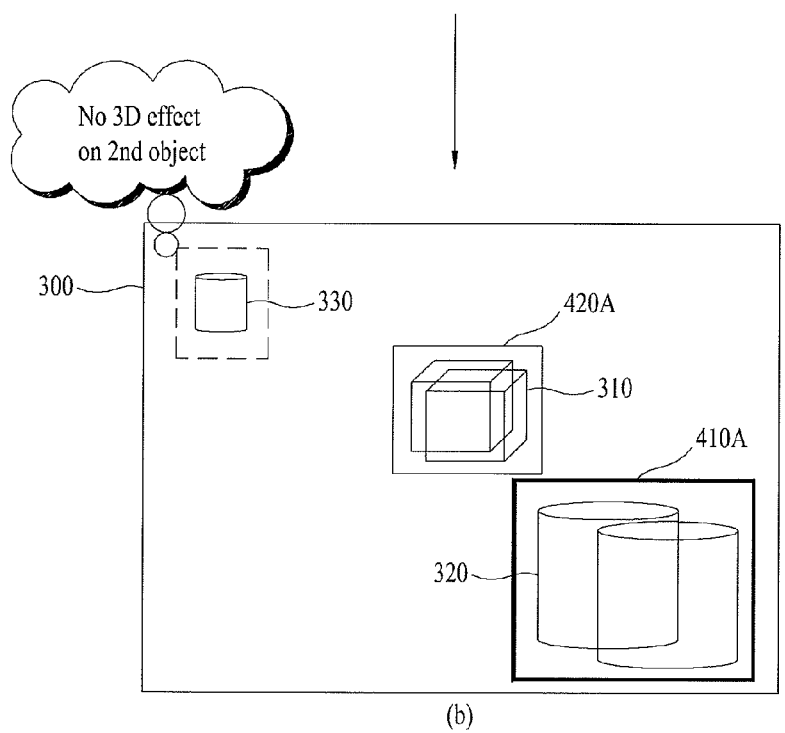

FIG. 22
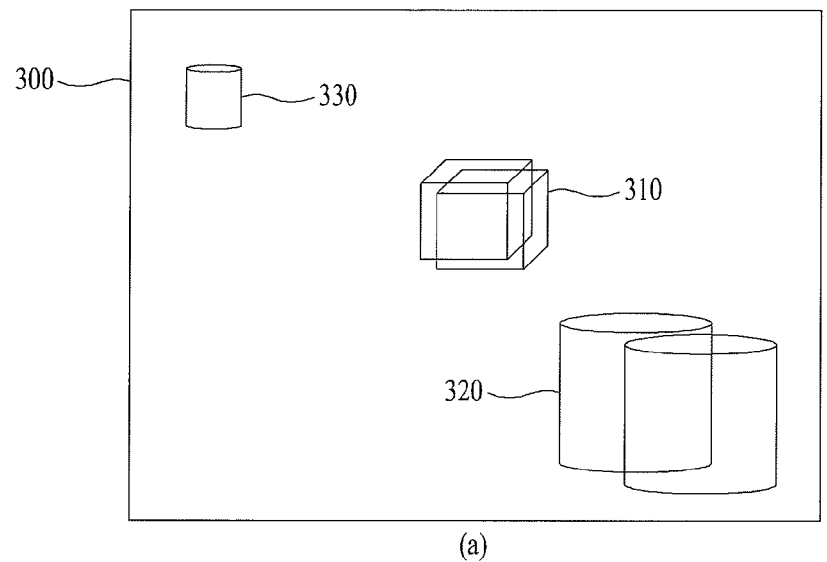
(a)
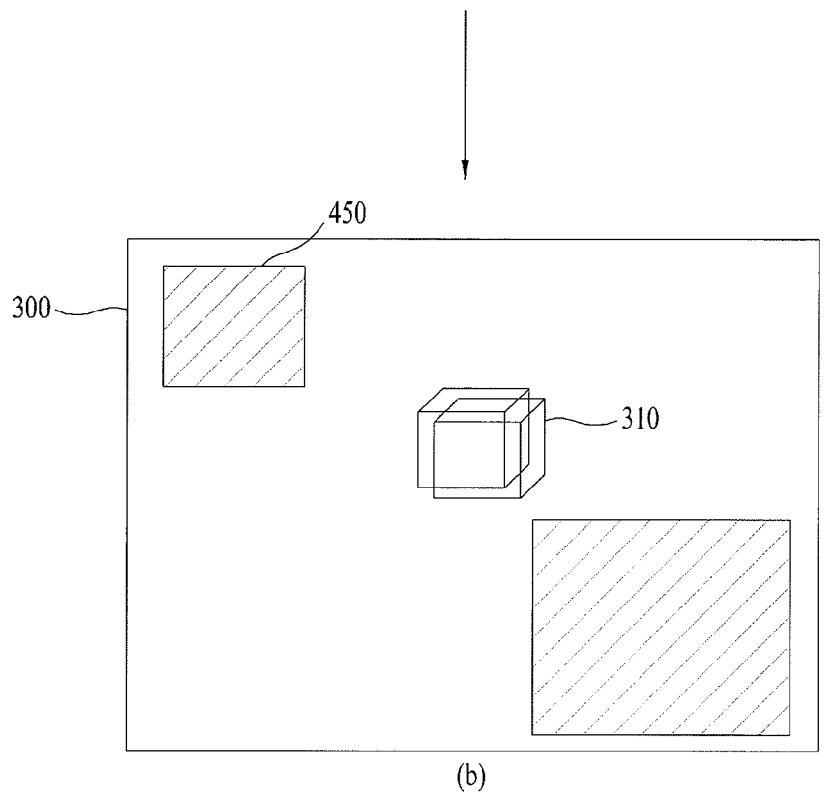
(b)

FIG. 23
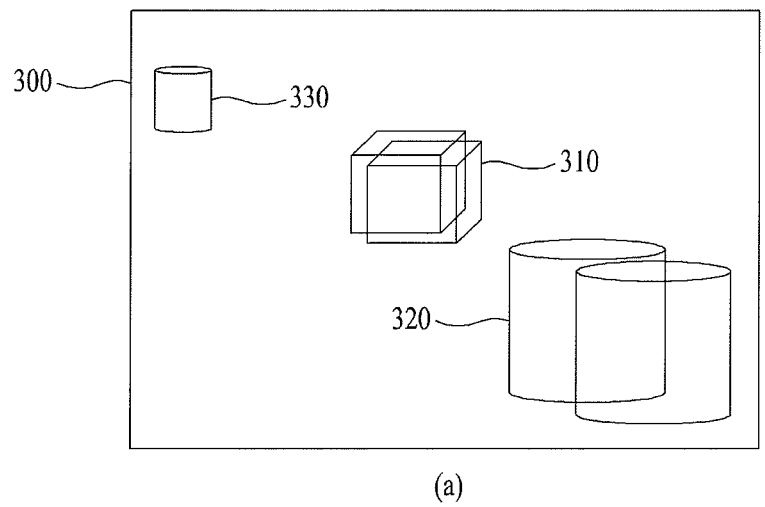
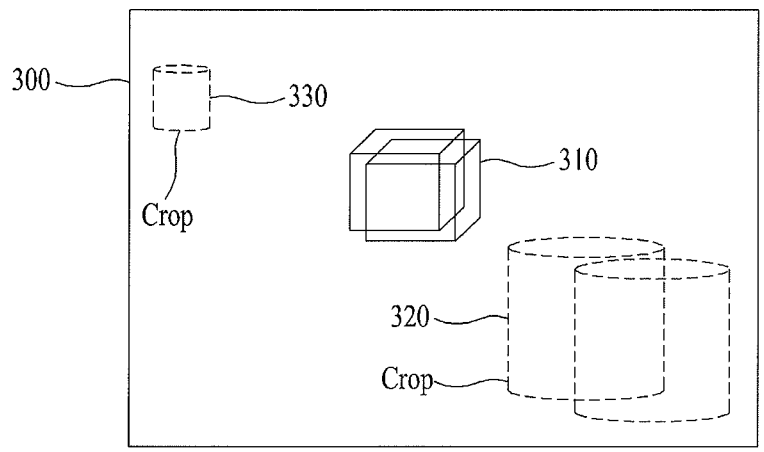
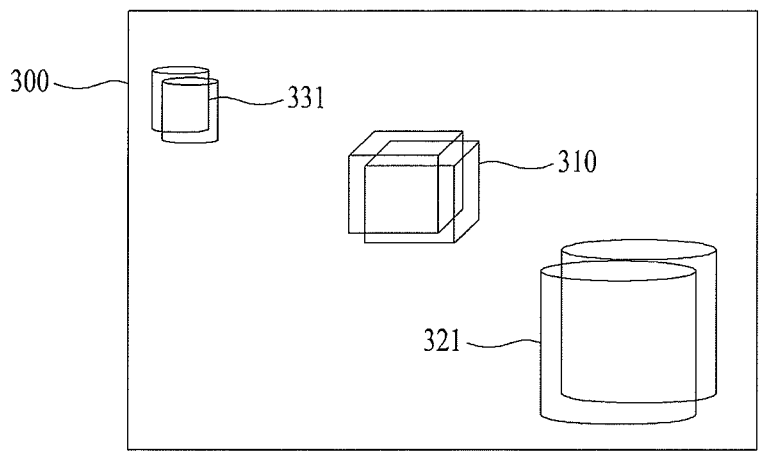

FIG. 24
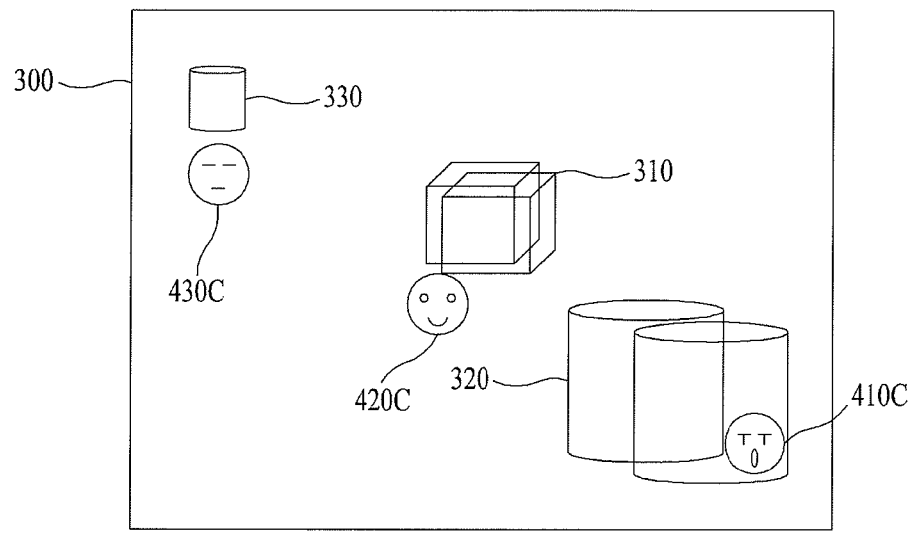
(a)
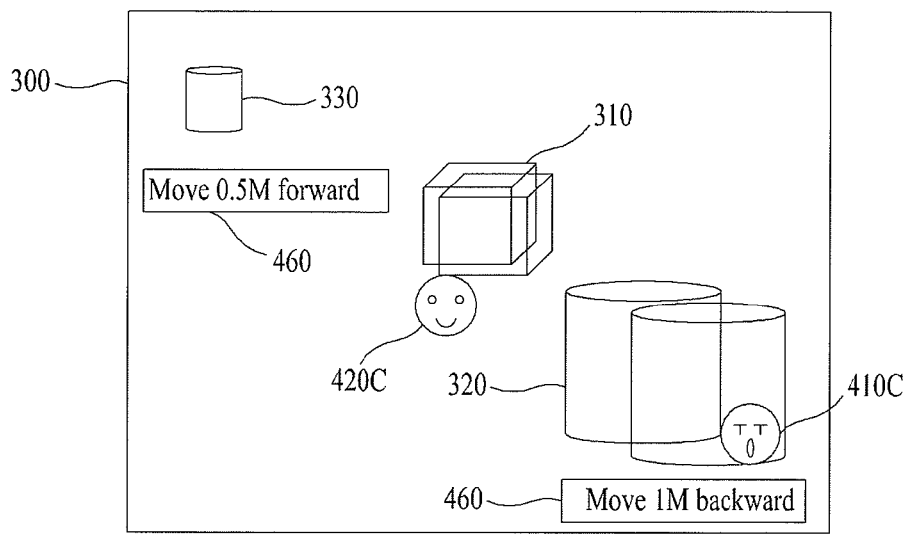
(b)

FIG. 25
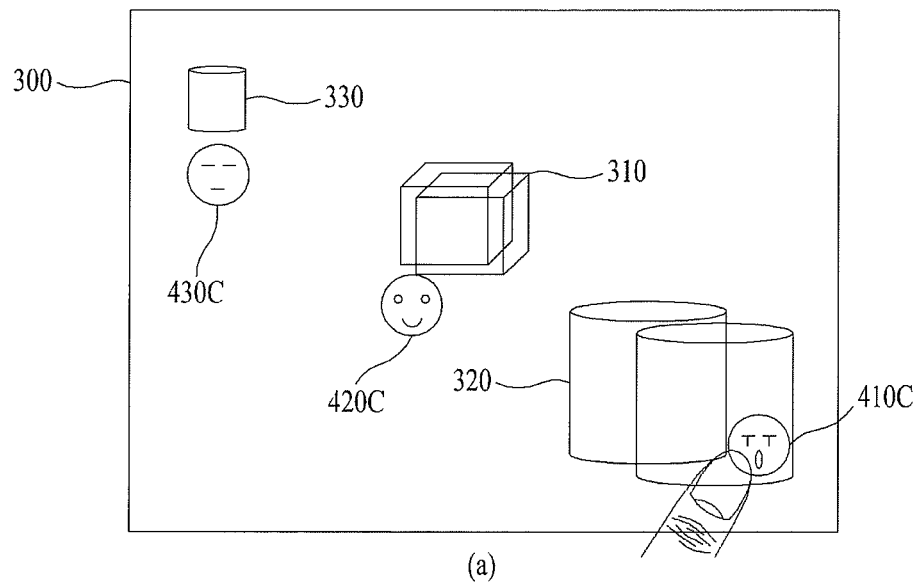
(a)
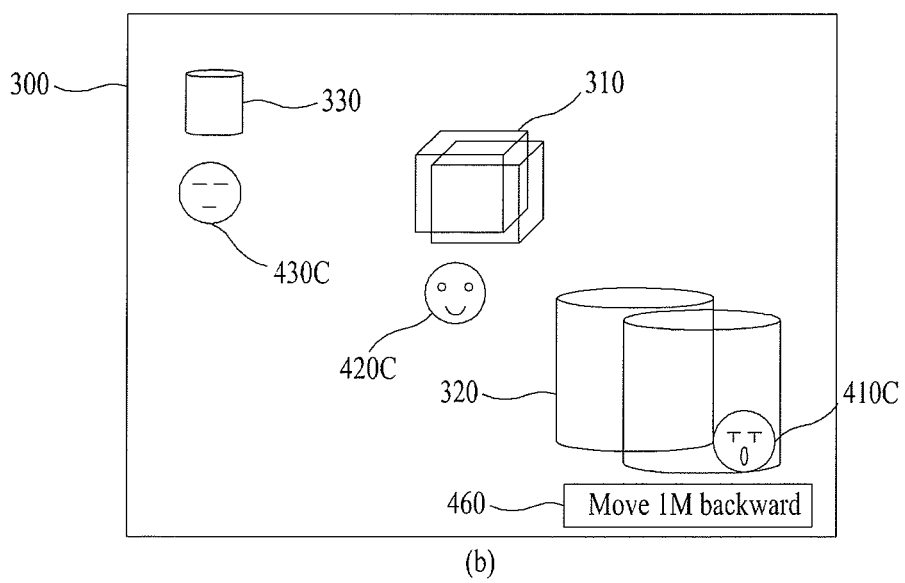
(b)

FIG. 29

| 1st 3D image file (First.swf) | | | |
|---|---|---|---|
| Frame No | The number of objects | The number of 3D-optimized objects | 3D photographed state |
| 1st frame | 3 | 3 | GOOD |
| 2nd fame | 3 | 1 | BAD |
| 3rd frame | 3 | 3 | GOOD |
| 3D photographed state of 1st 3D image file: GOOD | | | |
| 2nd 3D image file (Second.swf) | | | |
| Frame No | The number of objects | The number of 3D-optimized objects | 3D photographed state |
| 1st frame | 3 | 1 | BAD |
| 2nd fame | 3 | 2 | BAD |
| 3rd frame | 4 | 4 | GOOD |
| 3D photographed state of 2nd 3D image file: BAD | | | |
| 3rd image file (Third.swf) | | | |
| Frame No | The number of objects | The number of 3D-optimized objects | 3D photographed state |
| 1st frame | 3 | 3 | GOOD |
| 2nd fame | 3 | 1 | BAD |
| 3rd frame | 4 | 4 | GOOD |
| 3D photographed state of 3rd 3D image file: GOOD | | | |

(a)

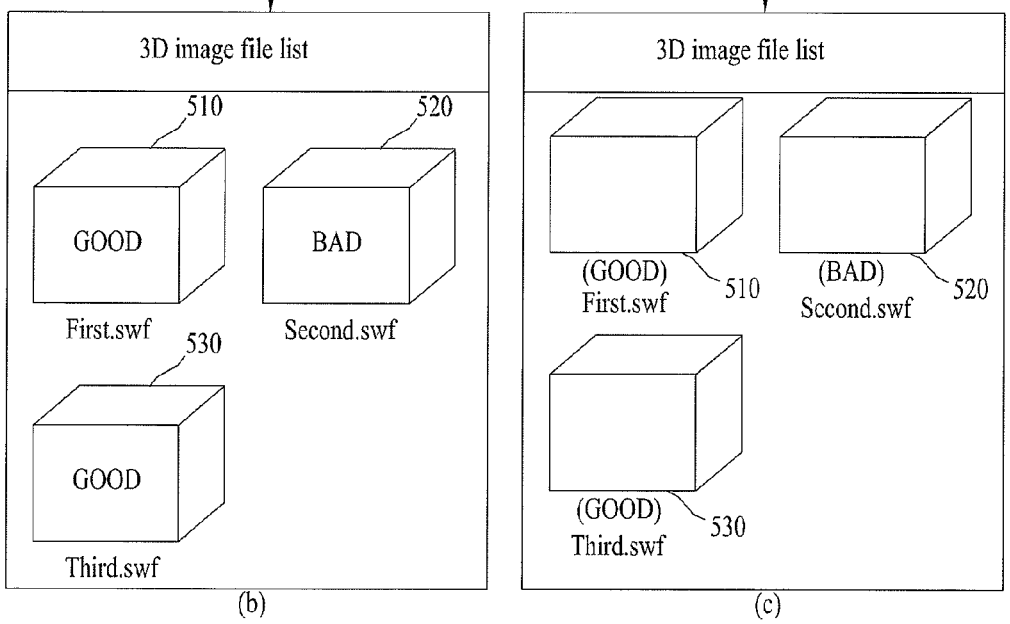

(b)          (c)

MOBILE TERMINAL AND 3D IMAGE CONTROLLING METHOD THEREIN

CROSS-REFERENCE TO RELATED APPLICATIONS

Pursuant to 35 U.S.C. §119(a), this application claims the benefit of earlier filing date and right of priority to Korean Application No. 10-2010-0066807, filed on Jul. 12, 2010, the contents of which are hereby incorporated by reference herein in their entirety.

BACKGROUND OF THE INVENTION

1. Field of the Invention

The present invention relates to a mobile terminal, and more particularly, to a mobile terminal and 3D image controlling method thereof.

2. Description of Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to mobility. Mobile terminals can be further classified into handheld terminals and vehicle mount terminals.

There are ongoing efforts to support and increase the functionality of mobile terminals. Such efforts include software and hardware improvements, as well as changes and improvements in the structural components which form the mobile terminal.

Recently, as 3-dimensional (hereinafter abbreviated 3D) functionality is being implemented on a display unit of a terminal, the demands for providing various functions using the 3D image continue rise.

In particular, a plurality of cameras for photographing left and right-eye images are provided to a mobile terminal. A 3D image can be generated using the left and right-eye images inputted from the cameras. Meanwhile, when a user views the 3D image generated in the above manner, if an object having a 3D effect of excessive parallax exists in the 3D image, user's eyes easily become fatigued or the user may feel dizziness.

BRIEF SUMMARY OF THE INVENTION

Accordingly, the present invention is directed to a mobile terminal and 3D image controlling method thereof that substantially obviate one or more problems due to limitations and disadvantages of the related art.

An object of the present invention is to provide a mobile terminal and 3D image controlling method thereof, by which a user can be informed of a state of a 3D effect on objects in a 3D image in a manner of indicating an object having an excessive parallax in a currently photographed 3D image or an object having an optimal 3D effect in the currently photographed 3D image, and the like to the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first camera configured to capture a left-eye image for generating a 3D image, a second camera configured to capture a right-eye image for generating the 3D image, a display unit configured to display the 3D image generated based on the left-eye image and the right-eye image, and a controller configured to determine an extent of a 3D effect on at least one object included in the 3D image, and to control the display unit to display information indicating the determined extent of the 3D effect.

In another aspect of the present invention, a method of controlling a 3D image in a mobile terminal includes capturing a left-eye image by a first camera of the mobile terminal, capturing a right-eye image by a second camera of the mobile terminal by a second camera of the mobile terminal, generating the 3D image using the left-eye image and the right-eye image, displaying the generated 3D image, recognizing an extent of a 3D effect on a first object included in the generated 3D image, and displaying information indicating the determined extent of the 3D effect.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 is a diagram illustrating a scheme of implementing a 3D stereoscopic image in a display unit of a parallax barrier type applicable to embodiments of the present invention;

FIGS. 6 to 14 are diagrams for describing 3D images according to exemplary embodiments of the present invention;

FIGS. 16 to 30 are diagrams of screen configurations relating to controlling a 3D image in a mobile terminal according to the exemplary embodiments of the present invention.

DETAILED DESCRIPTION OF THE INVENTION

In the following detailed description, reference is made to the accompanying drawing figures which form a part hereof, and which show by way of illustration exemplary embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

Figure 1:
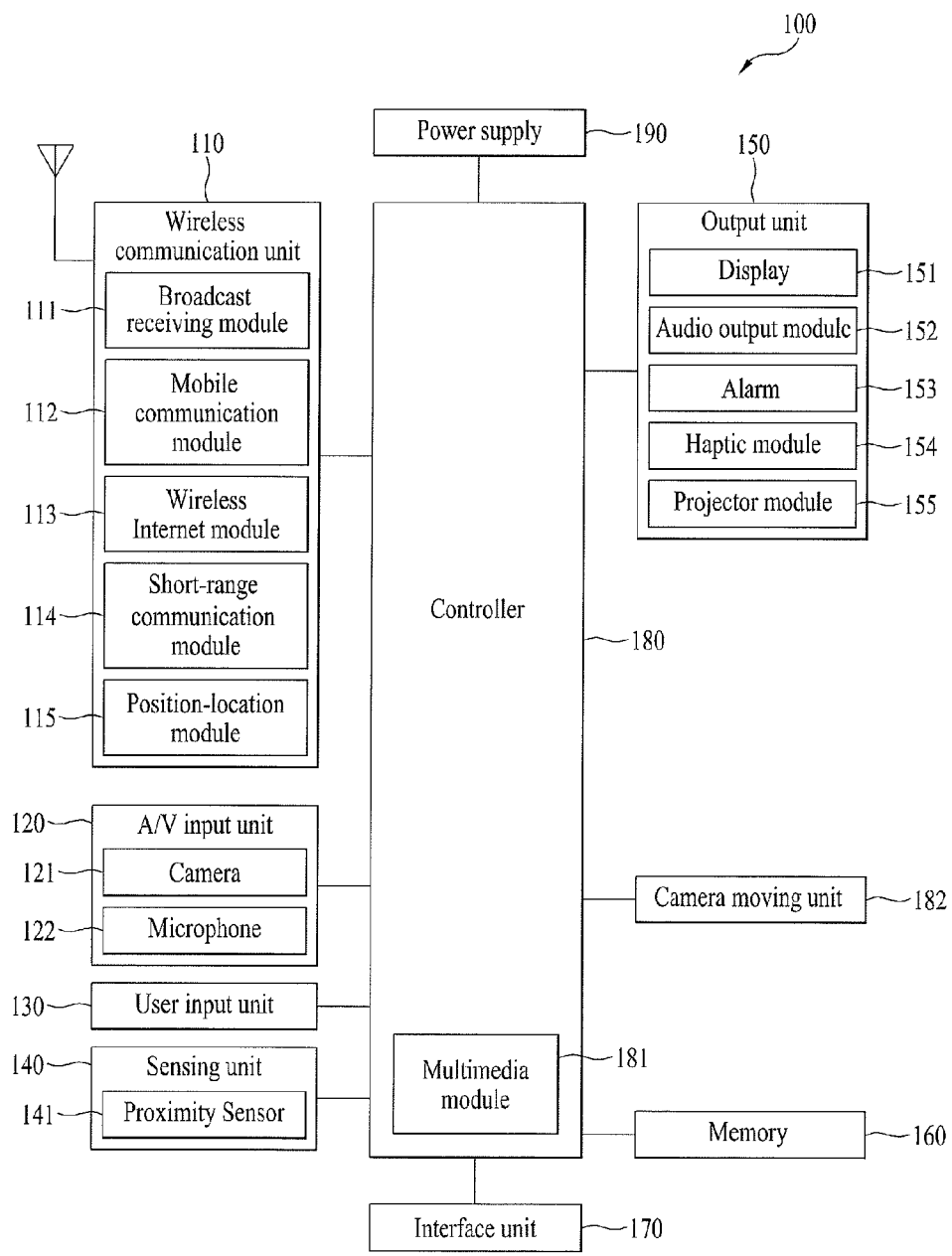
FIG. 1 is a block diagram of a mobile terminal according to an exemplary embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an audio/video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless interne module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message, among others.

The wireless internet module 113 supports Internet access for the mobile terminal 100. This module may be internally or externally coupled to the mobile terminal 100. In this case, the wireless Internet technology can include Wireless LAN (WLAN), Wi-Fi, Wireless broadband (Wibro), World Interoperability for Microwave Access (Wimax), High Speed Downlink Packet Access (HSDPA), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the A/V input unit 120 is configured to provide audio or video signal input to the mobile terminal 100. As shown, the A/V input unit 120 includes a camera 121 and a microphone 122. The camera 121 possesses a digital zoom and processes image frames of still pictures or video, which are obtained by an image sensor in a video call mode or a photographing mode. And, the processed image frames can be displayed on the display 151. The image frames processed by the camera 121 can be stored in the memory 160 or can be externally transmitted via the wireless communication unit 110.

Figure 2A:
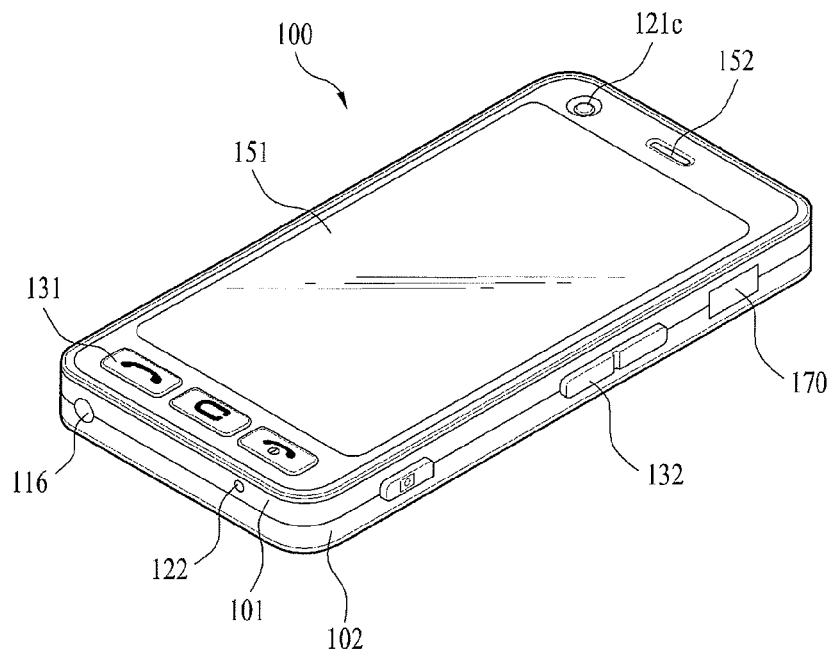
FIG. 2A illustrates a front perspective view of a mobile terminal according to an exemplary embodiment of the present invention.
Figure 2B:
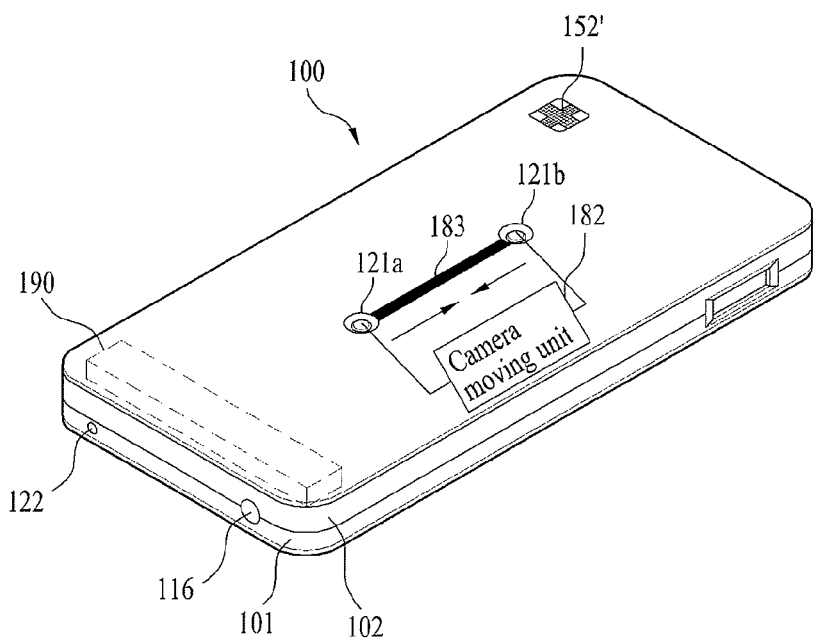
FIG. 2B illustrates a rear perspective view of the mobile terminal of FIG. 2A.

Optionally, as shown in FIGS. 2A and 2B, at least two cameras 121 can be provided to the mobile terminal 100 according to environment of usage. For instance, the camera 121 can include a first camera 121a and a second camera 121b provided for 3D image photographing at a surface of a mobile terminal opposite to another face of the mobile terminal on which the display unit 151 of the mobile terminal 100 is located. A third camera 121c for user's self-photographing can be provided to a prescribed region of the face provided with the display unit 151 of the mobile terminal 100. In this arrangement, the first camera 121a is provided for photographing a left-eye image as a source image of a 3D image, while the second camera 121b is provided for photographing a right-eye image as a source image of the 3D image, for example.

Referring again to FIG. 1, the microphone 122 receives an external audio signal while the mobile terminal 100 is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, if the mobile terminal 100 is configured as a slide-type mobile terminal, the sensing unit 140 may sense whether a sliding portion of the mobile terminal 100 is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates outputs relevant to the senses of sight, hearing, touch and the like. Accordingly, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI, or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays. Some of the above displays can be implemented in a transparent or optical transmittive type, which can be named a transparent display. As a representative example for the transparent display, there is transparent OLED (TOLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') is arranged as a mutual layer structure (hereinafter called 'touch screen'), a user is able to use the display 151 as an input device as well as an output device. In this case, the touch sensor can be configured as a touch film, a touch sheet, a touch pad or the like. The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touch screen or around the touch screen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, it is configured to detect the proximity of a pointer using a variation of electric field according to the proximity of the pointer. In this arrangement, the touch screen (touch sensor) can be classified as the proximity sensor.

In the following description, for clarity, an action that a pointer approaches without contacting the touch screen while being recognized as located on the touch screen is named 'proximity touch'. And, an action that a pointer actually touches the touch screen is referred to as a 'contact touch'. The meaning of the position on the touch screen proximity-touched by the pointer means the position of the pointer which vertically opposes the touch screen when the pointer performs the proximity touch.

The proximity sensor detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be outputted to the touch screen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence. The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. The projector module 155 is able to display an image, which is identical to or partially different at least from the image displayed on the display 151, on an external screen or wall according to a control signal of the controller 180. The projector module 155 can include a light source (not shown in the drawing) to generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. The projector module 155 can further include a device (not shown in the drawing) for adjusting an image projected direction by mechanically moving the lens or the whole module.

The projector module 155 can be classified into a cathode ray tube (CRT) module, a liquid crystal display (LCD) module, a digital light processing (DLP) module, or the like according to a device type of a display means. In particular, the DLP module is operated by the mechanism of enabling the light generated from the light source to reflect on a digital micro-mirror device (DMD) chip and can be advantageous for the downsizing of the projector module 151.

The projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touch screen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touch screen as characters or images, respectively.

Meanwhile, a camera moving unit 182 is provided between the first and second cameras 121a and 121b for 3D image photographing. And adjusts a gap or space between the first and second cameras 121a and 121b by moving the first and second cameras 121a and 121b with reference to a middle point between the first and second cameras 121a and 121b.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention. While the mobile terminal 100 is shown as a bar type terminal, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) defining an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided in the terminal body, and more particularly, at the front case 101. As shown, the display 151 occupies most of a main face of the front case 101. The audio output unit 151 and the camera 121 are provided to an area adjacent to one end portion of the display 151, while the user input unit 131 and the microphone 122 are provided at an area adjacent to the other end portion of the display 151. The user input unit 132 and the interface 170 can be provided at lateral sides of the front and rear cases 101 and 102.

The input unit 130 is manipulated to receive a command for controlling an operation of the terminal 100. The input unit 130 may include a plurality of manipulating units 131 and 132. The manipulating units 131 and 132 can be referred to as a manipulating portion and may adopt any mechanism of a tactile manner that enables a user to perform a manipulation action by experiencing a tactile feeling. Content inputted by the first or second manipulating unit 131 or 132 can be diversely set. For instance, such a command as start, end, scroll and the like may be inputted by the first manipulating unit 131 and a command for a volume adjustment of sound outputted from the audio output unit 152, a command for a switching to a touch recognizing mode of the display 151 or the like can be inputted by the second manipulating unit 132.

FIG. 2B is a perspective diagram of a backside of the terminal shown in FIG. 2A. Referring to FIG. 2B, a first camera 121a and a second camera 121b for 3D image photographing can be additionally provided at the backside of the terminal body, and more particularly, to the rear case 102. In particular, the first and second cameras 121a and 121b are arranged on a straight line within a range not to exceed a typical user's eye distance (e.g., 6.0-6.5 cm). And, a rail 183 enabling the first and second cameras 121a and 121b to move thereon is located between the first and second cameras 121a and 121b. Thus, the first and second cameras 121a and 121b can move towards and away from each other via the rail 183 under the control of a camera moving unit 182.

In this configuration, the first and second cameras 121a and 121b enable a normal 2D image photographing as well as the 3D image function. Moreover, a mirror and flash can be further provided around the first and second cameras 121a and 121b (not shown in the drawing). The flash projects light toward a subject in case of photographing the subject using the first and second cameras 121a and 121b. In case that a user attempts to take a picture of himself (self-photographing) using the first and second cameras 121a and 121b, the mirror enables the user to view his face reflected by the mirror. Meanwhile, each of the first and second cameras 121a and 121b has a photographing direction substantially opposite that of the third camera 121c and may have pixels identical to or different from those of the third camera 121c. For instance, the third camera 121c may have low pixels to be sufficient to photograph and transmit a picture of user's face for a video call and the like, while each of the first and second cameras 121a and 121b has high pixels for photographing a general subject that is not intended to be sent instantly.

An additional audio output unit 152' can be provided at the backside of the terminal body. The additional audio output unit 152' is able to implement a stereo function together with the front audio output unit 152 shown in FIG. 2A and may be used for implementation of a speakerphone mode in talking over the terminal.

A broadcast signal receiving antenna 16 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

In the following description, a method of controlling a 3D image in a mobile terminal applicable to embodiments of the present invention will be explained. Stereoscopic images implemented on the display unit 151 of the mobile terminal 100 according to the present invention can be mainly classified into two kinds of categories, monoscopic and stereoscopic.

The first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a 3D image can substantially include a planar image (2D image).

The second category is a stereoscopic scheme of providing different images to both eyes, respectively, which uses the principle that a user can sense a stereoscopic effect in looking at an object with human eyes. In particular, human eyes see different planar images when looking at the same object due to a distance between both eyes. These different images are provided to the human brain via the retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity. Accordingly, binocular disparity becomes an important factor of the second category.

Figure 3:
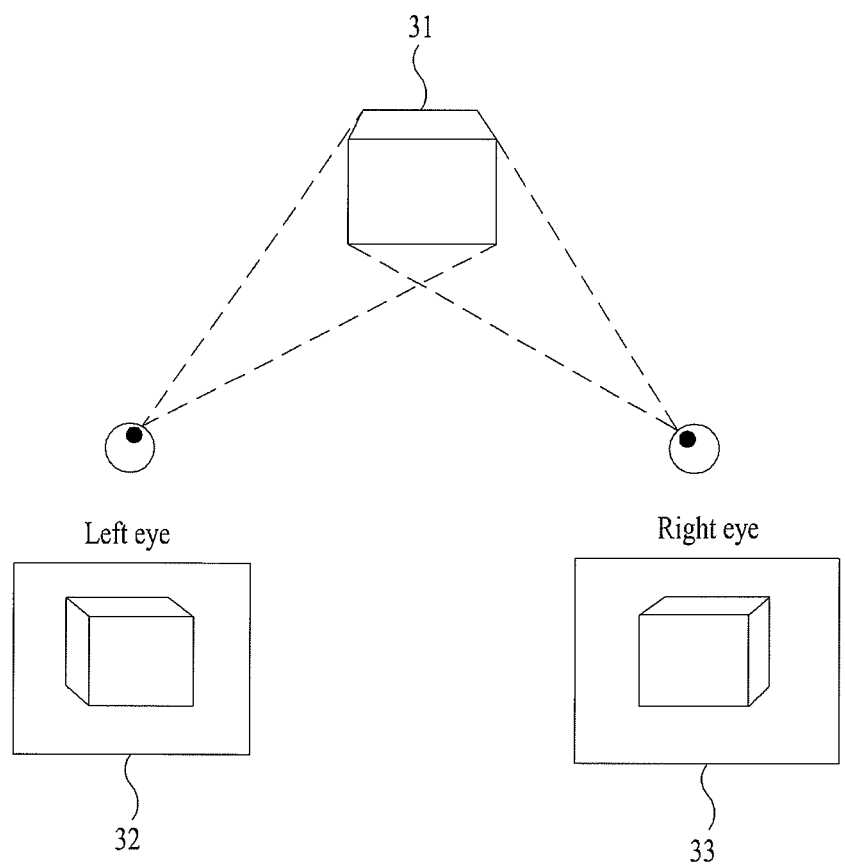
FIG. 3 is a diagram for explaining the principle of binocular disparity.

The binocular disparity is explained in detail with reference to FIG. 3 as follows. Referring to FIG. 3, assume a situation that a hexahedron 31 is positioned as a subject in front and below an eye's height to be seen through human eyes. In this case, the left eye is able to see a left-eye planar image 32 revealing three facets including a top side, a front side and a left lateral side of the hexahedron 31 only and the right eye is able to see a right-eye planar image 33 revealing three facets including the top side, the front side and a right lateral side of the hexahedron 31 only. Even if a real thing is not actually positioned in front of both eyes of a user, if the left-eye planar image 32 and the right-eye planar image 33 are set to arrive at the left eye and the right eye, respectively, a user is able to substantially sense the hexahedron 31 as if looking at the actual hexahedron 31.

Thus, in order to implement the 3D image belonging to the second category in the mobile terminal 100, images of the same object should arrive at both eyes in a manner of being discriminated from each other for the left and right-eye images of the same object with a predetermined parallax.

Figure 4:
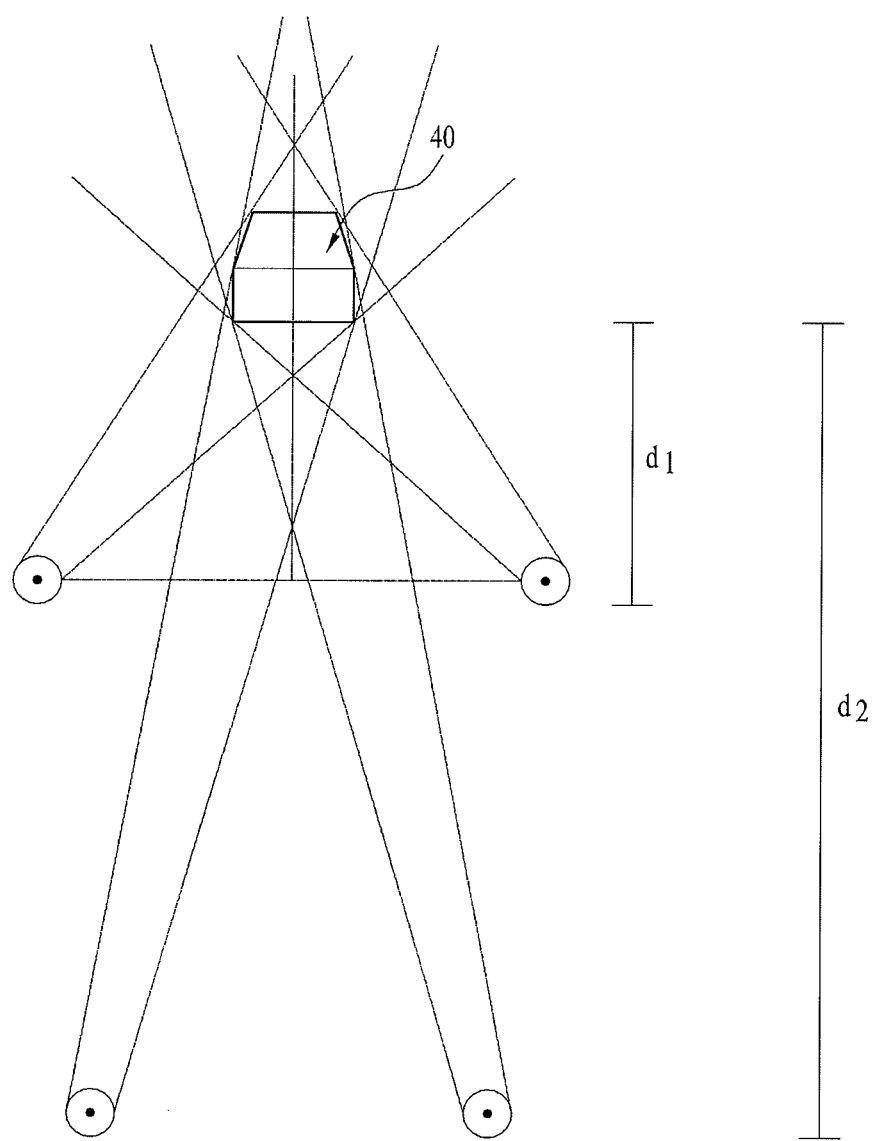
FIG. 4 is a diagram for illustrating the concept of a sense of distance and 3D depth attributed to binocular disparity.

In the following description, 3D depth attributed to the binocular disparity (parallax) is explained with reference to FIG. 4. Referring to FIG. 4, a lateral side ratio of an image entering each eye in view of a hexahedron 40 in a distance d1 trough both eyes is relatively higher than that in a distance d2, whereby a difference between images seen through both eyes increases. Moreover, an extent of a stereoscopic effect sensed by a user in view of the hexahedron 40 at the distance d1 is greater than that in view of the hexahedron 40 at the distance d2. In particular, when a thing is seen through both eyes of a user, a closer subject gives a greater stereoscopic effect, whereas a farther subject gives a smaller stereoscopic effect. Such a difference in stereoscopic effect can be digitized into a 3D depth or a 3D level.

As mentioned in the following description, in order to implement a 3D stereoscopic image, an image for a right eye and an image for a left eye need to arrive at both eyes in a manner of being discriminated from each other. For this, various methods are possible as set forth below.

1) Parallax Barrier Scheme

The parallax barrier scheme enables different images to arrive at both eyes in a manner of controlling a propagating direction of light by electronically driving a cutoff device provided between a general display and both eyes, as shown in FIG. 5. Referring to FIG. 5, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 600, as shown in FIG. 5(a), using the switch LC 151b, whereby the light is separated into two different lights to arrive at left and right eyes, respectively. Thus, when an image generated from combining an image for the right eye and an image for the left eye together is displayed on the display device 151a, a user sees the images for the corresponding eye, respectively, thereby providing the 3D or stereoscopic effect.

Alternatively, when the parallax barrier 600 attributed to the switch LC is electrically controlled to enable entire light to be transmitted therethrough, as shown in FIG. 5(b), the light separation due to the parallax barrier is avoided. Therefore, the same image can be seen through the left and right eyes. In this case, the function of a conventional display unit is available.

While the parallax barrier scheme has been described as performing parallel translation in one axial direction, the present invention is not limited to just this arrangement. The present invention is able to use a parallax barrier that enables parallel translation in at least two axial directions according to a control signal from the controller 180.

2) Lenticular

The lenticular scheme (not shown) relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a similar to that of polarized glasses scheme. In particular, a right-eye image and a left-eye image are alternately displayed on a display unit with prescribed periodicity. While the left-eye image is being displayed, a shutter of the right eye is closed to enable the left-eye image to arrive at the left eye only. While the right-eye image is being displayed, a shutter of the left eye is closed to enable the right-eye image to arrive at the right eye only.

A mobile terminal according to the exemplary embodiments of the present invention is able to provide a user with a 3D stereoscopic image via the display unit 151 by at least any one of the above described methods.

Because the 3D image principle described with reference to FIG. 4 and FIG. 5 assumes a stereoscopic object, the object in a left-eye image differs from the object in a right-eye image in shape. Yet, if an object is not a stereoscopic object but a planar object, a shape of the object in a left-eye image is identical to that of the object in a right-eye image. If a position of the object in the left-eye image is different from that of the object in the right-eye image, a user is able to perceive a perspective view. For purposes of the present application, the description will be based on the assumption that the stereoscopic image in the following description is a planar object. Of course, it is apparent to those skilled in the art that the present invention is applicable to stereoscopic objects as well.

Figure 6:
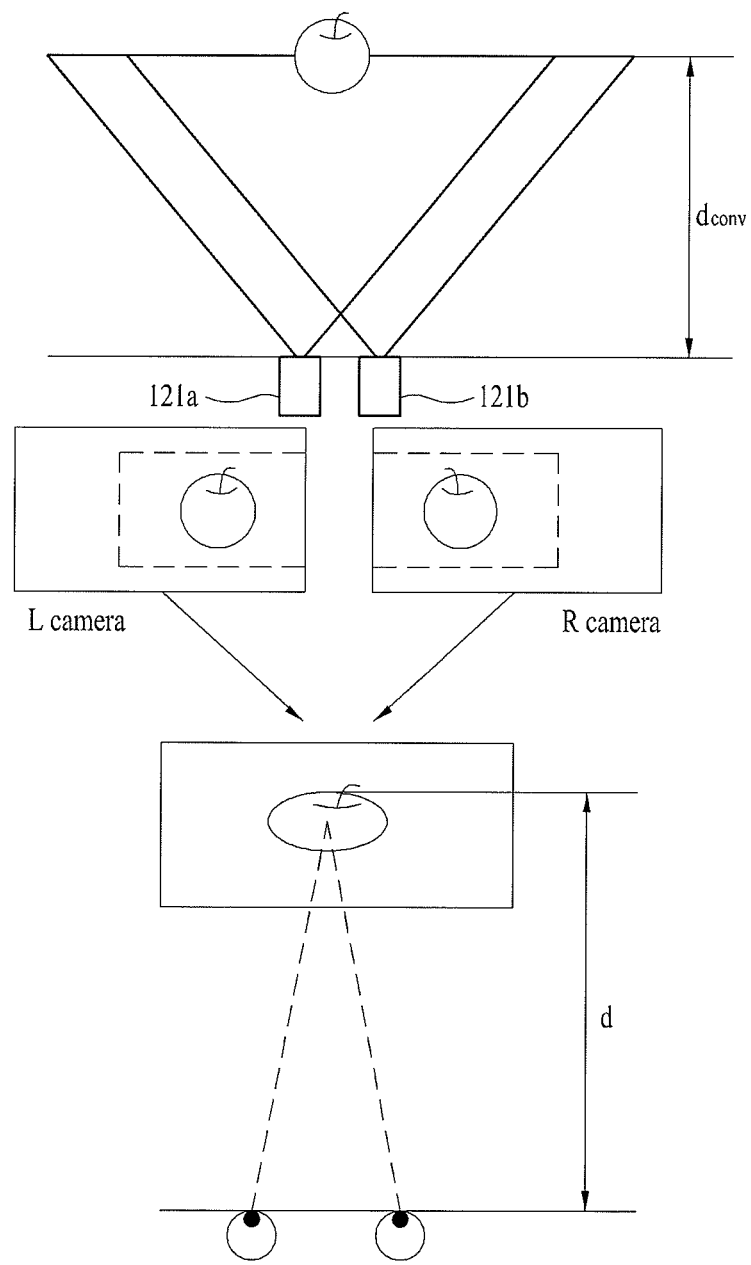

In the following description, a 3D image according to the present invention is explained with reference to FIGS. 6 to 14. Referring to FIG. 6, if a left-eye image and a right-eye image for a subject for photography are taken via the first and second cameras 121a and 121b, a 3D image for the subject is generated and displayed using the left-eye image and the right-eye image. In this case, '$d_{conv}$' indicates a distance for generating a convergence zero point between the subject and the first and second cameras 121a and 121b. The convergence zero point indicates a point at which visual points of both eyes of a user converge together. An optimal 3D effect is generated with reference to the distance in which the convergence zero point is generated.

Figure 14:
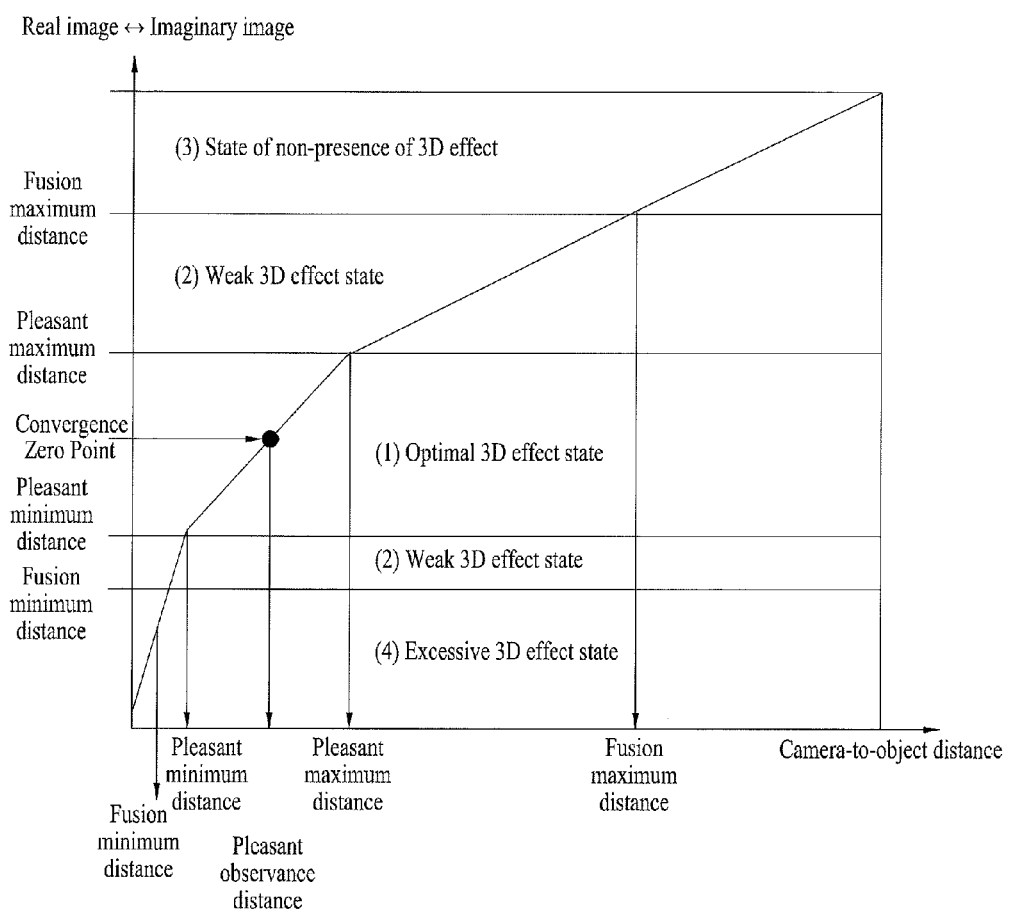

In particular, referring to the graph shown in FIG. 14, it can be observed that the 3D effect is optimized when the distance between the subject and the first and second cameras 121a and 121b approaches the distance for generating the convergence zero. When the distance between the subject and the first and second cameras 121a and 121b becomes more distant from the distance for generating the convergence zero point, it can be observed that an excessive or weak 3D effect is generated or the 3D effect is not generated at all.

Figure 7:
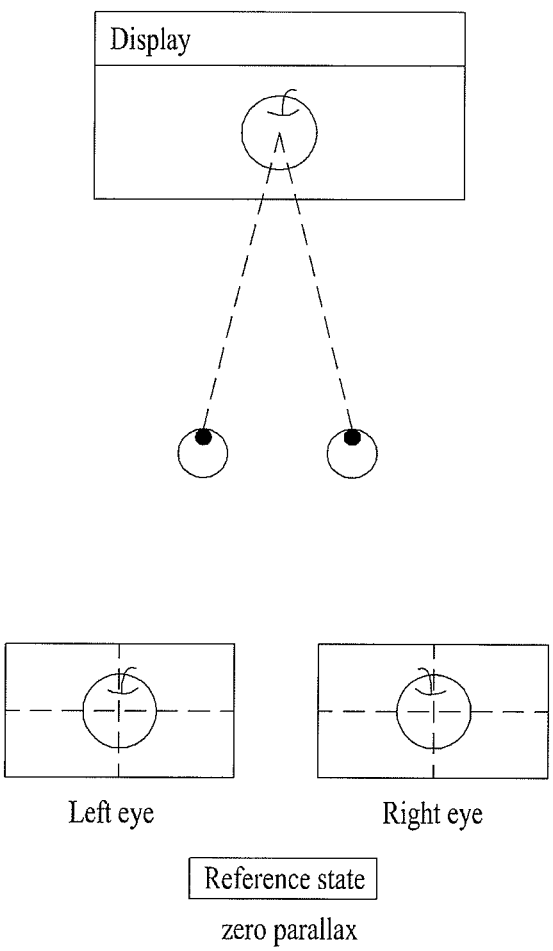
Figure 8:
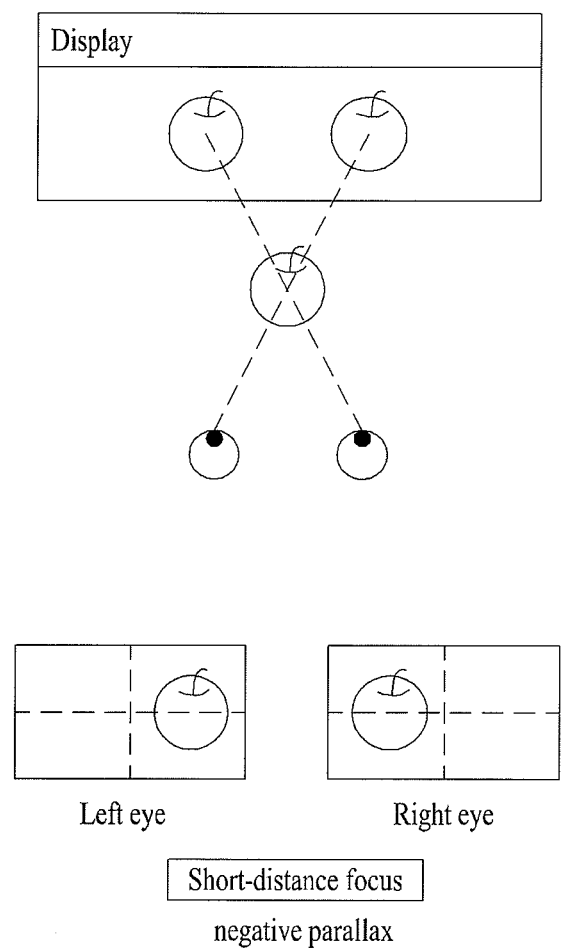
Figure 9:
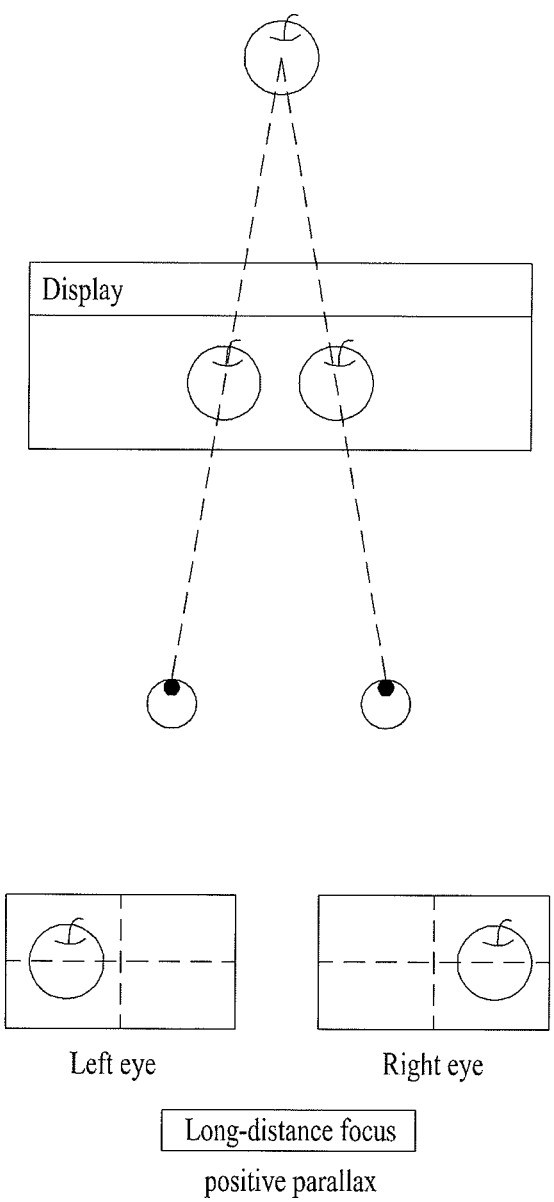

FIGS. 7 to 9 show that a 3D effect on the subject varies according to a reference view, a short-distance view, or a long-distance view between a user and a subject. In particular, FIG. 7 shows a state of a reference view at which a convergence zero point is generated. FIG. 8 show that if a difference in overlapping left and right images for the subject increases with reference to the convergence zero point, a 3D effect is generated as if the subject pops out forward. FIG. 9 shows that if a difference in overlapping left and right images for the subject decreases with reference to the convergence zero point, a 3D effect is generated as if the subject is further back.

FIG. 10 and FIG. 11 are diagrams for explaining a fusion limit parallax. Referring to FIG. 10 and FIG. 11, a cubic effect sensed by a user is determined by a parallax (i.e., angle) and a size of the parallax is determined as a relative parallax with reference to a parallax α of a display plane. Namely, a size of a relative parallax 'α–β' for providing a cubic effect has a limit that is called a fusion limit parallax. If the fusion limit parallax is generated, a subject is viewed as an excessive double image as shown in FIG. 10(c), which may cause nausea accompanied by headache, dizziness and the like to a user not accustomed to the fusion limit parallax. Although the size of the fusion limit parallax is difference among individuals, it may be set to 2 degrees. And, a size of a long-term viewable parallax is about 1 degree.

In the situation of a negative parallax, shown in FIG. 10, a limit parallax depends on an angle only. In case of the positive parallax, shown in FIG. 11, a limit parallax depends on a distance on a display. In this case, the limit parallax on the display is determined to be about 5 cm in consideration of an inter-eye gap of an individual in general.

FIG. 12 is a diagram for explaining an absolute limit of a positive parallax. Referring to FIG. 12, a negative (short-distance) representation has an angle limit only. Yet, in case of a positive (long-distance) representation, since human eyes are naturally unable to be widened outwards, a distance on a screen has a limit.

Finally, FIG. 13 is a diagram demonstrating a relation between a gap between the first and second cameras 121a and 121b for 3D photographing and a parallax. Referring to FIG. 13, if the gap between the first and second cameras 121a and 121b decreases, it can be observed that an angle of parallax also decreases. If the gap between the first and second cameras 121a and 121b increases, it can be observed that an angle of parallax also increases. In particular, by adjusting the gap between the first and second cameras 121a and 121b, it is possible to optimize the 3D effect on a subject in a manner of adjusting the angle of the parallax.

Figure 15:
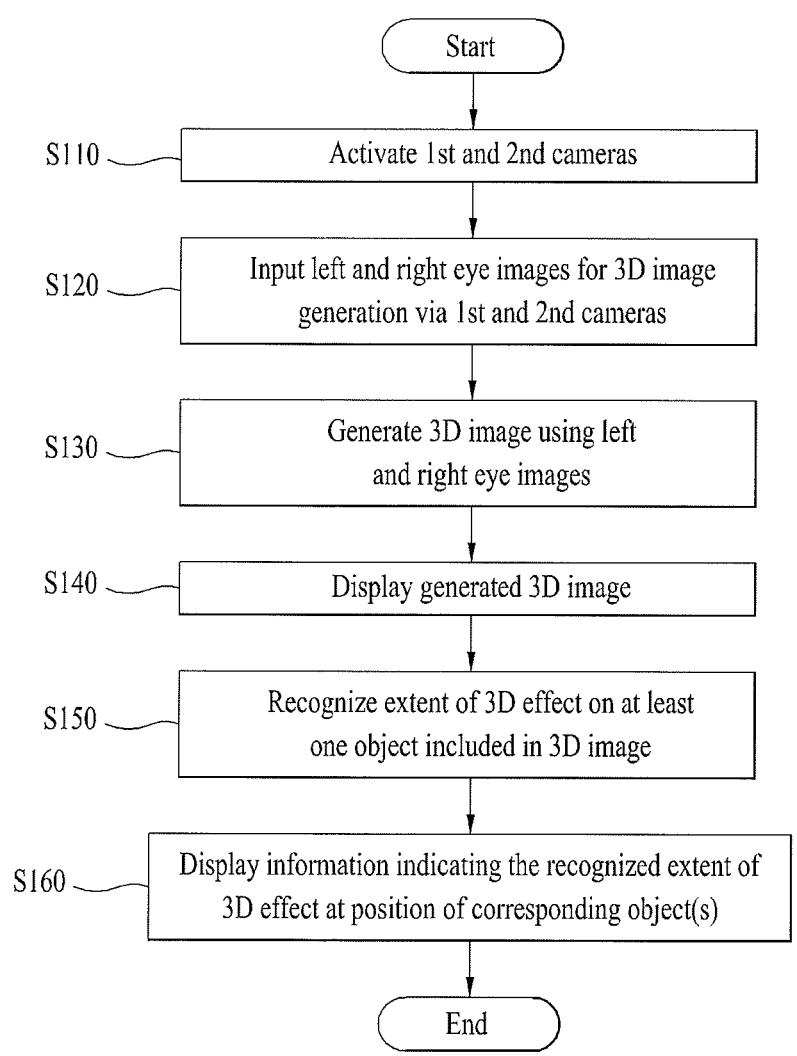
FIG. 15 is a flowchart illustrating a method of controlling a 3D image in a mobile terminal according to an exemplary embodiment of the present invention.

Based on the foregoing understanding, a method of informing a user of a state of a 3D effect on objects within a 3D image by controlling the 3D image according to the present invention will be explained in detail with reference to FIGS. 15 to 30. FIG. 15 is a flowchart for a method of controlling a 3D image in a mobile terminal according to the present invention and FIGS. 16 to 30 are diagrams of screen configurations for a method of controlling a 3D image in a mobile terminal according to the present invention.

Referring to FIGS. 15 to 30, if a menu for 3D photographing is selected from a menu list, the controller 180 of the mobile terminal 100 activates the first and second cameras 121a and 121b for the 3D photographing (S110) and then receives inputs of a left-eye image and a right-eye image as a source image for 3D image generation from the first and second cameras 121a and 121b (S120).

The controller 180 generates a 3D image 300 using the inputted left and right-eye images (S130) and then displays the generated 3D image 300 on the display unit 151 (S140). Subsequently, the controller 180 recognizes or determines positions of objects 310, 320, and 330 included in the generated 3D image 300 and then recognizes or determines an extent of a 3D effect on each of the objects 310, 320, and 330 (S150). According to this exemplary embodiment, the positions of the objects 310, 320, and 330 can be found using a general object tracking algorithm.

The extent of the 3D effect of the objects 310, 320, and 330, as shown in FIG. 14, can be determined using a convergence zero point between the first and second cameras 121a and 121b and the objects as a reference value. In particular, for example, referring to FIG. 16(a), if the gap between the first object 310 and the first and second cameras 121a and 121b approaches the distance for generating the convergence zero point backward and forward, it can be observed that the first object 310 has an optimized 3D effect. If the distance between the second object 320 and the first and second cameras 121a and 121b does not approach the distance for generating the convergence zero point but becomes shorter than a fusion minimum distance, it can be observed that the second object 320 has an excessive 3D effect. In particular, as the second object 320 has the excessive 3D effect, nausea such as headache, dizziness and the like can be caused to a user. If the distance between the second object 320 and the first and second cameras 121a and 121b does not approach the distance for generating the convergence zero point but becomes longer than a fusion minimum distance, it can be observed that the second object 320 barely has a 3D effect.

As mentioned in the above description, if the extent of the 3D effect on each of the objects 310, 320, and 330 is determined, the controller 180 controls information indicating the determined extent of the 3D effect to be displayed at positions of the corresponding objects 310, 320, and 330 within the 3D image.

In particular, each time each frame of the 3D image 300 changes, the controller 180 frequently determines the positions of the objects 310, 320, and 330 includes within the 3D image 300 the extents of the 3D effects of the objects 310, 320, and 330 and then modifies the information indicating the extent of the 3D effect based on the determined extent of 3D effect. Therefore, the controller 180 is able to inform a user of a real-time state of the 3D effect on each of the objects 310, 320, and 330.

Once the user becomes aware of the states of the 3D effects on the objects 310, 320, and 330 through the displayed information, the user can adjusts the gap between the first and second cameras 121*a* and 121*b* manually. Therefore, the 3D effects on the objects 320, and 330 having poor 3D effects can be optimized. Alternatively, the 3D effects can be optimized by adjusting the distance between the mobile terminal 100 and the objects 320, and 330. As yet another alternative, if a command for optimizing the 3D effects on the objects 320, and 330 having the poor 3D effects is inputted by a user, the controller 180 is able to optimize the 3D effects on the objects 320, and 330 having the poor 3D effects in a manner of adjusting the gap between the first and second cameras 121*a* and 121*b* by controlling the camera moving unit 182.

The information indicating the extent of the 3D effect can include the information indicating at least one of an optimal state of the 3D effects on the objects 310, 320, and 330 with reference to the convergence zero point, an excessive state of the 3D effect, and a state having no 3D effect. Moreover, referring to FIG. 16 and FIG. 17, the information may be represented as a guide box 400A at a corresponding position of each of the objects 310, 320, and 330 within the 3D image 300. The controller 180 is able to inform a real-time state of a 3D effect on each of the objects 310, 320, and 330 in a manner of changing a color, a shape or the like of the guide box according to a 3D effect extent of each of the objects 310, 320, and 330. Referring to FIG. 16(*a*), the first object 310 has an optimized 3D effect. The second object 320 has an excessive 3D effect. And, the third object 330 barely has a 3D effect.

FIG. 16 (*b*) shows the guide box 400A as the information indicating the extent of the 3D effect on the objects 310, 320, and 330. The guide box 400A includes a first guide box 410A indicating an excessive 3D effect state, a second guide box 420A indicating an optimal 3D effect state, and a third guide box 430A indicating a state of non-presence of the 3D effect according to the extent of the 3D effect. Referring to FIG. 16 (*b*), the first guide box 410A has an outline of a greatest thickness, the second guide box 420A has an outline of an intermediate thickness, and the third guide box 430A has an outline of a smallest thickness.

Thus, a user is able to determine the extents of the 3D effects of the first to third objects 310, 320, and 330 by observing the thickness of the outlines of the first to third guide boxes 410A, 420A, and 430A, respectively. Moreover, the outlines of the first to third guide boxes 410A, 420A and 430A can be represented with colors differing from each other according to the extents of the 3D effects of the first to third objects 310, 320, and 330, respectively (not shown). A user is then able to determine the current extents of the 3D effects by observing the colors of the outlines of the first to third guide boxes 410A, 420A and 430A, respectively. Whole parts of the first to third guide boxes 410A, 420A, and 430A can be represented with colors differing from each other according to the extents of the 3D effects of the first to third objects 310, 320, and 330, respectively (not shown). A user is then able to determine the current extents of the 3D effects of the first to third by observing the colors of the whole parts of the first to third guide boxes 410A, 420A and 430A, respectively.

The controller 180 determines the extents of the guide boxes 410A, 420A and 430A and then displays guide boxes 410A, 420A and 430A corresponding to the extents of the 3D effects of the objects 310, 320, and 330, respectively (FIG. 16 (*c*)). Therefore, the controller 180 is able to inform a user of the extents of the 3D effects of the first to third objects 310, 320, and 330.

FIG. 17 shows that the controller 180 may inform a user of the extents of the 3D effects of the first to third objects 310, 320, and 330 in a manner of displaying the first to third guide boxes 410A, 420A and 430A according to the extents of the 3D effects of the first to third objects 310, 320, and 330 by blinking. In this exemplary embodiment, the blinking display means that each of the first to third guide boxes 410A, 420A and 430A is displayed in a manner of being set to blink by a preset periodicity. In particular, the controller 180 displays the first guide box 410A indicating the excessive 3D effect state by a greatest count of blinking. The controller 180 displays the second guide box 420A indicating the optimal 3D effect state by a smallest count of blinking or without blinking. And, the controller 180 displays the third guide box 430A indicating the state of a non-presence of the 3D effect by an intermediate count of blinking. Therefore, the controller 180 is able to inform, a user of the extents of the 3D effects of the first to third objects 310, 320, and 330.

Moreover, referring to FIG. 18, the information may be represented as a text 400B at a corresponding position of each of the objects 310, 320, and 330 within the 3D image 300. The controller 180 is able to inform a real-time state of a 3D effect on each of the objects 310, 320, and 330 in a manner of displaying the text 400B corresponding to a 3D effect extent of each of the objects 310, 320, and 330. In particular, FIG. 18 shows the text 400B as the information indicating the extent of the 3D effect on each of the first to third objects 310, 320, and 330. The text 400B includes a first text 410B indicating an excessive 3D effect state, a second text 420B indicating an optimal 3D effect state and a third text 430B indicating a state of non-presence of a 3D effect. Therefore, the user is able to determine current extents of the 3D effects of the first to third objects 310, 320, and 330 by observing contents of the first to third texts 410B, 420B and 430B, respectively.

In yet another alternative, referring to FIG. 19, the information is represented as an icon 400C at a corresponding position of each of the objects 310, 320, and 330 within the 3D image 300. The controller 180 is able to inform a real-time state of a 3D effect on each of the objects 310, 320, and 330 in a manner of displaying the icon 400C corresponding to a 3D effect extent of each of the objects 310, 320, and 330. In particular, FIG. 19 shows the icon 400C as the information indicating the extent of the 3D effect on each of the first to third objects 310, 320, and 330. The icon 400C includes a first icon 410C indicating an excessive 3D effect state, a second icon 420C indicating an optimal 3D effect state and a third icon 430C indicating a state of non-presence of a 3D effect. Therefore, the user is able to determine current extents of the 3D effects of the first to third objects 310, 320, and 330 by observing contents of the first to third icons 410C, 420C and 430C, respectively. Furthermore, colors of the first to third icons 410C, 420C and 430C can be varied according to the extents of the 3D effects of the first to third objects 310, 320, and 330, respectively (not shown). The user is then able to determine the current extents of the 3D effects of the first to third objects 310, 320, and 330 by observing the colors of the first to third icons 410C, 420C and 430C, respectively. Even further, sizes of the first to third icons 410C, 420C and 430C can be varied according to the extents of the 3D effects of the first to third objects 310, 320, and 330, respectively (not shown). The user is then able to determine the current extents of the 3D effects of the first to third objects 310, 320, and 330 by observing the sizes of the first to third icons 410C, 420C and 430C, respectively.

As shown in FIG. 20, the information may be represented as a color 400D at a corresponding position of each of the objects 310, 320, and 330 within the 3D image 300. The controller 180 is able to inform a real-time state of a 3D effect on each of the objects 310, 320, and 330 in a manner of displaying the color 400D at a corresponding position of each of the objects 310, 320, and 330. In particular, FIG. 20 shows the color 400D as the information indicating the extent of the 3D effect on each of the first to third objects 310, 320, and 330. The color 400D includes a first color 410D indicating an excessive 3D effect state, a second color 420D indicating an optimal 3D effect state and a third color 430D indicating a state of non-presence of a 3D effect. Therefore, the user is able to determine current extents of the 3D effects of the first to third objects 310, 320, and 330 by observing the first to third colors 410D, 420D and 430D, respectively.

The controller 180, as shown in FIG. 21, is able to output a sound for indicating the extents of the 3D effects of the objects 310, 320, and 330 as well as the information indicating the extents of the 3D effects of the objects 310, 320, and 330. The controller 180 outputs the sound for indicating the extent of the 3D effect for objects 320 and 330, for which the 3D effect is not optimized, among the objects 310, 320, and 330 by controlling the audio output module 152. The sound for indicating the extent of the 3D effect is provided to the memory 160 in advance. The controller 180 outputs positions and extents of the 3D effects of the corresponding objects 320, and 330 for which the 3D effects have not been optimized, among the objects 310, 320, and 330 in order of low optimization level. In doing so, FIG. 21 (*a*) shows that a sound for indicating an extent of the 3D effect of the second object 320, which may cause a greatest unpleasant feeing to a user with an excessive 3D effect, is outputted. FIG. 21 (*b*) shows that a sound for indicating an extent of the 3D effect of the third object 330 is outputted after the sound for the second object 320 has been outputted.

Referring to FIG. 22, the controller 180 may overlay the second object 320 having the excessive 3D effect and the third object 330 having a weak 3D effect or no 3D effect with a specific color 450 among objects 310, 320, and 330 within a currently photographed 3D image 300 (FIG. 22 (*b*)), thereby enabling the objects 320 and 320, for which the 3D effect is not optimized, not to be identified within the currently photographed 3D image 300. In particular, when the objects 320 and 330 fail to have an optimized 3D effect within the currently photographed 3D image 300, a user viewing a frame including the objects 320 and 330, for which the 3D effect has not been optimized, may have an unpleasant feeling. Therefore, the controller 180 overlays the objects, for which the 3D effect has not been optimized within a frame of the 3D image 300, thereby providing a user with a 3D image free from an unpleasant feeling.

Referring to FIG. 23, the controller 180 may be configured to crop the second object 320 having the excessive 3D effect and the third object 330 having a weak 3D effect or no 3D effect among objects 310, 320, and 330 within a currently photographed 3D image 300 (FIG. 23 (*b*)). The controller 180 may then synthesizes parts 321 and 331 of a previous frame of the 3D image 300 with the positions of the cropped second and third objects 320 and 320, respectively and then displays the synthesized image (FIG. 23 (*c*)). In this exemplary embodiment, the parts 321 and 331 of the previous frame mean the parts corresponding to the cropped second and third objects 320, and 330 within the previous frame. And, the parts 321 and 331 of the previous part have optimized 3D effects, respectively. In particular, the controller 180 crops the objects 320 and 330, for which 3D effect is not optimized, within the current frame, synthesizes the parts 321 and 331 having the optimized 3D effects in the previous frame with the positions of the cropped objects 320, and 330, and then displays the synthesized image. Therefore, the controller 180 is able to provide a user with the 3D image free from an unpleasant feeling.

Referring to FIG. 24, the controller 180 may first display information 410C, 420C and 430C indicating the extents of the 3D effects for the objects 310, 320, and 330, respectively (FIG. 24 (*a*)). Subsequently, the controller 180 may display guide information 460 indicating conditions for optimizing the 3D effects on the objects 320 and 330, for which the 3D effects are not optimized, among the objects 310, 320, and 330, respectively (FIG. 24 (*b*)). In this exemplary embodiment, the optimization condition can include a distance for adjusting the distance between the first and second cameras 121*a* and 121*b* and the objects 320 and 330, for which the 3D effects are not optimized, to approach the distance for generating the convergence zero point. Alternatively, the optimization condition can include a parallax.

Alternatively, as shown in FIG. 25, if one of the non-optimized objects 320 and 330 is selected or the information 410C indicating the 3D effect extent of the object 320 is selected (FIG. 25 (*a*)), the controller 180 is able to display the guide information 460 indicating the optimization condition of the 3D effect for the selected object 310 (FIG. 25 (*b*)).

Figure 26:
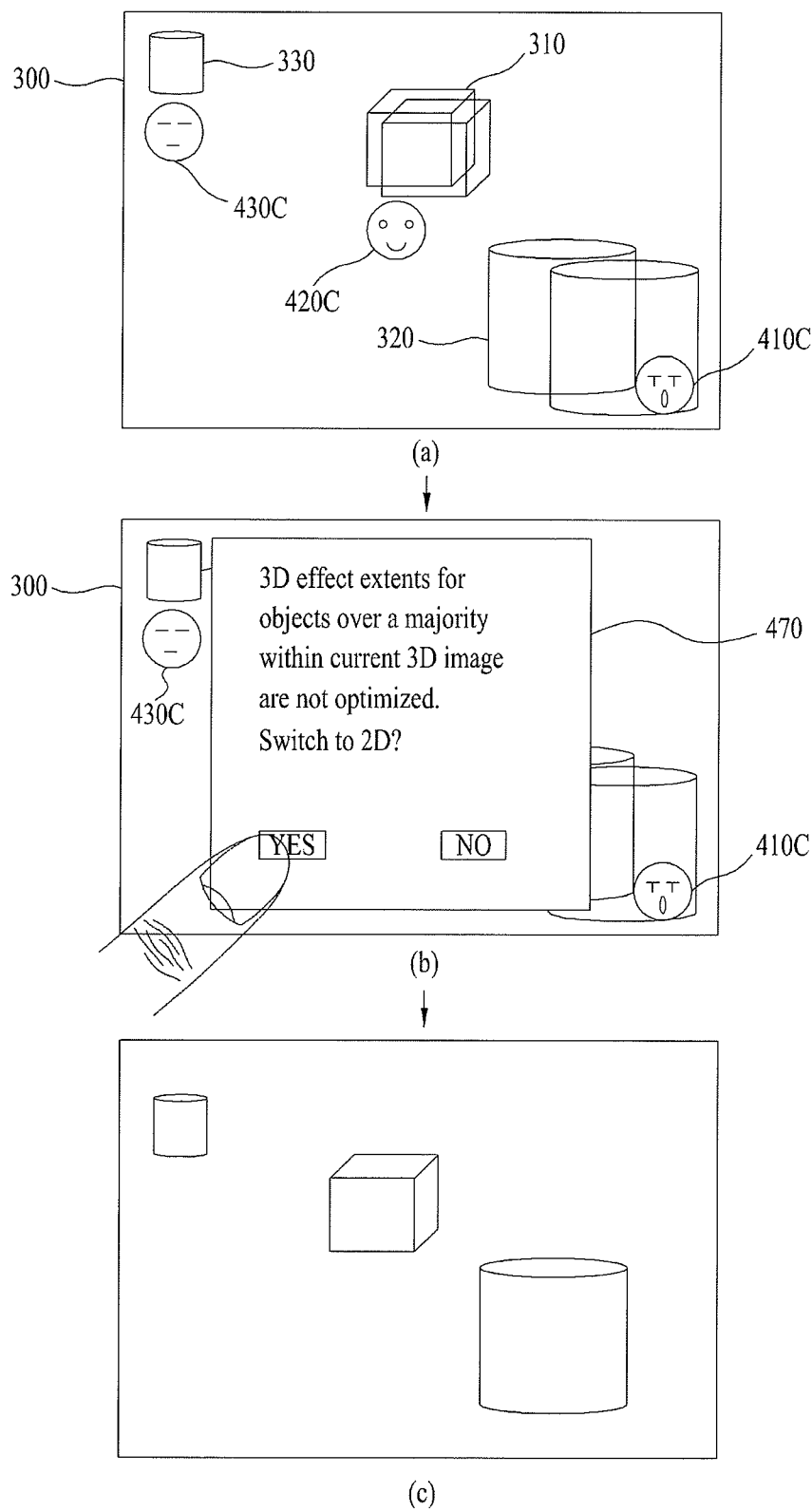

Referring to FIG. 26, if a ratio of the objects, for which extents of the 3D effects are not optimized compared to the total number of objects, within the 3D image 300 is equal to or greater than a preset rate, the controller 180 may be configured to switch the 3D image 300 to a 2D image to display. In particular, while the information 410C, 420C, and 430C indicating the extents of the 3D effects of the objects 310, 320, and 330, respectively, are displayed (FIG. 26 (*a*)), if the number of the objects 320 and 330, for which the 3D effects are not optimized, among the objects 310, 320, and 330 is equal to or greater than a majority or a preset ratio, the controller 180 is able to display a popup window 470 for querying whether to switch the 3D image 300 to a 2D image on the screen of the display unit 151. If a user inputs a command for switching the 3D image 300 to the 2D image via the popup window 470, the controller 180 switches the 3D image 300 to the 2D image and is then able to display the corresponding 2D image (FIG. 26 (*c*)).

Figure 27:
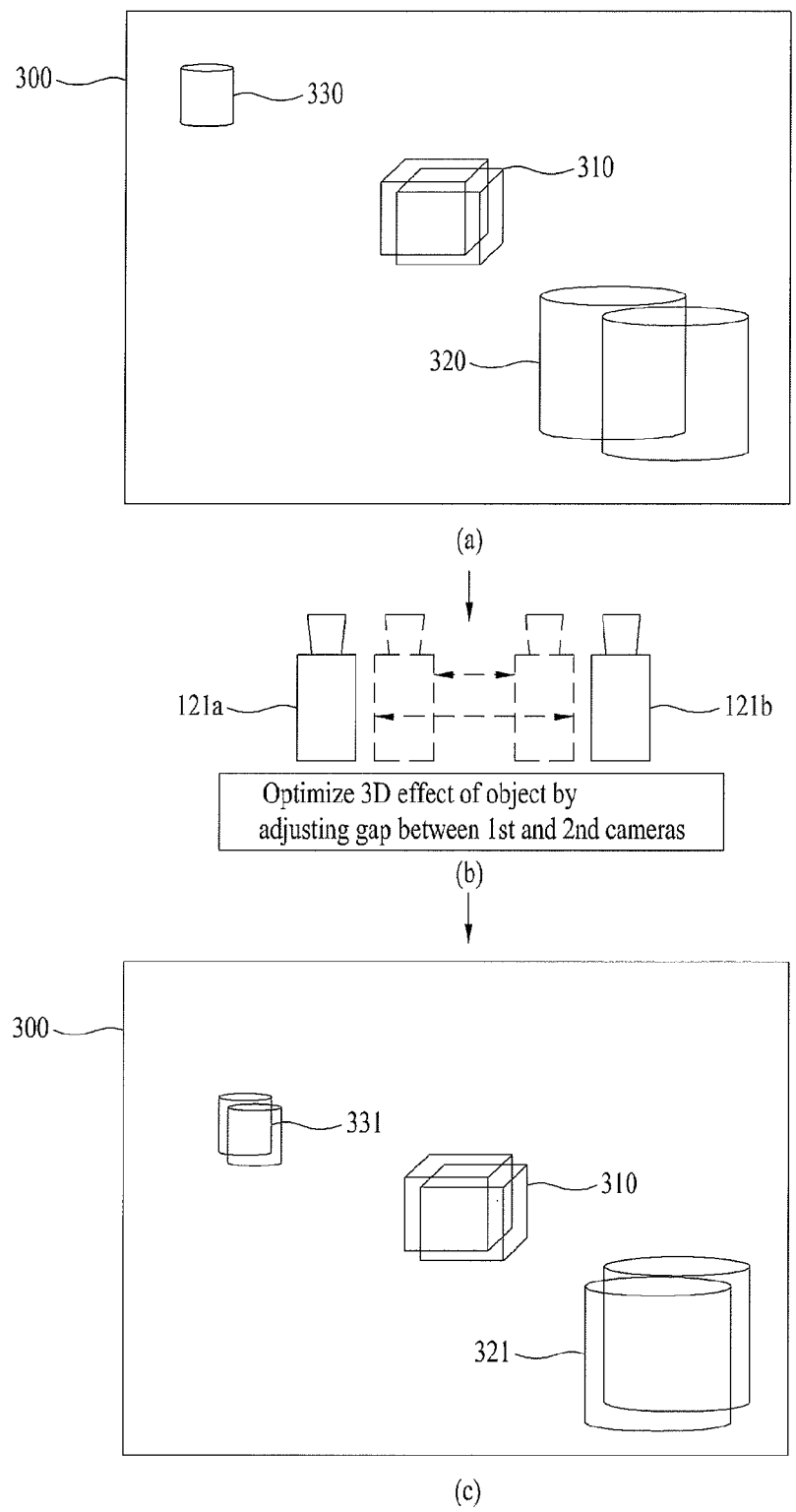
Figure 28:
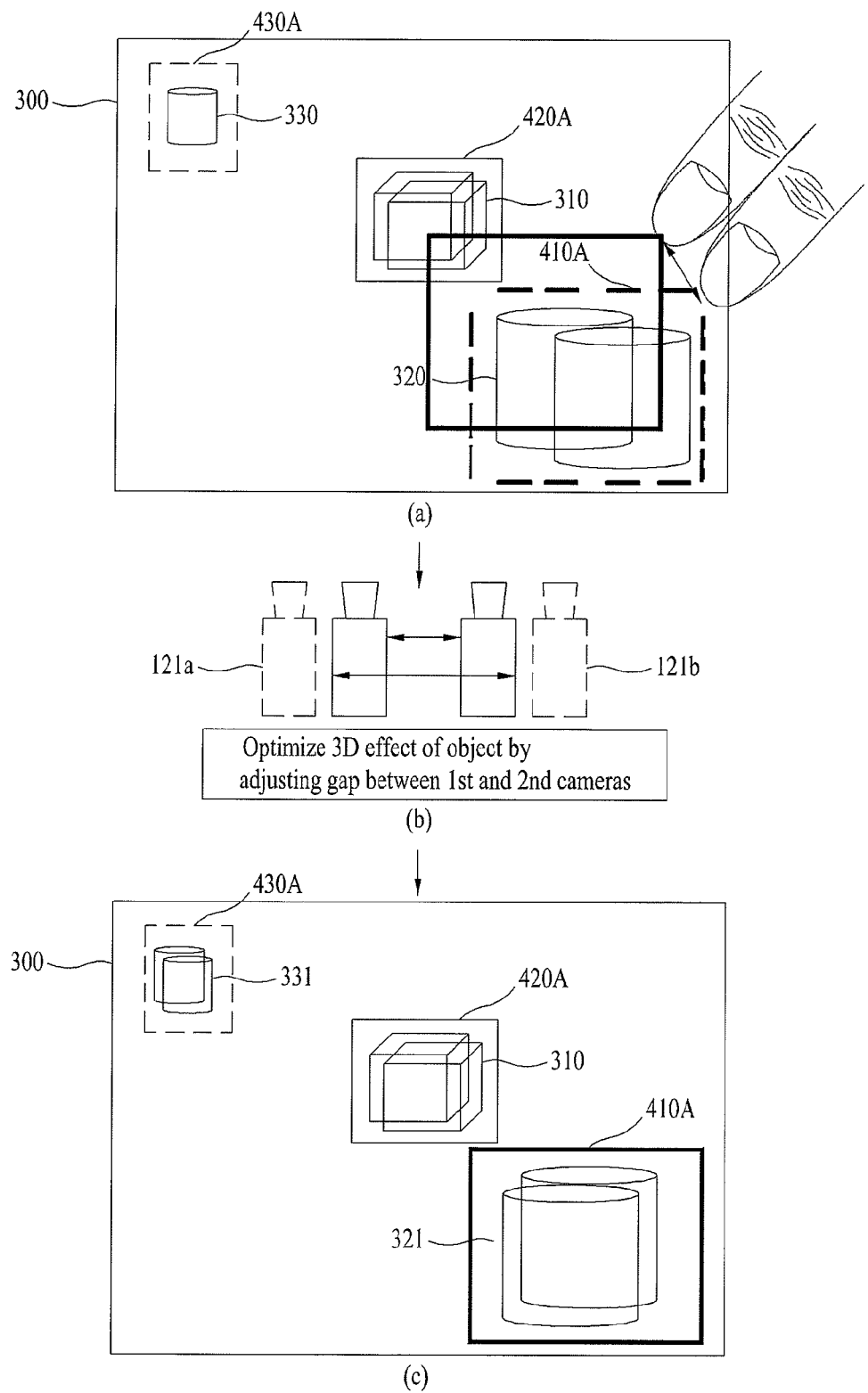

Referring to FIG. 27 and FIG. 28, when the controller 180 determines that the 3D effects are not optimized for objects 320 and 330, the controller 180 is able to optimize the 3D effects of the objects 320 and 330 by adjusting the gap between the first and second cameras 121*a* and 121*b* by controlling the camera moving unit 182. For example, as shown in FIG. 27, the controller 180 determines that the 3D effects of the objects 320 and 330 are not optimized within the 3D image 300 (FIG. 27 (*a*)). The controller 180 is then able to optimize the objects 320 and 330 by adjusting the gap between the first and second cameras 121*a* and 121*b* by controlling the camera moving unit 182 (FIG. 27 (*b*) and FIG. 27 (*c*)). In particular, the controller 180 attempts optimization for the objects 310 and 320, for which the 3D effects have not been optimized, by adjusting the initial gap between the first and second cameras 121*a* and 121*b* for the objects 310 and 320. Yet, in spite of adjusting the gap between the first and second cameras 121a and 121b, if the objects are not optimized, as mentioned in the foregoing description with reference to FIG. 24 and FIG. 25, the optimization condition 460 for the objects 320, and 330 is provided to the user. Therefore, the user is able to adjust the distance between the objects 320, and 330 to completely optimize the objects 320, and 330.

An alternative to the approach shown in FIG. 27 is shown in FIG. 28. In particular, while the information 410C, 420C, and 430C indicating the extents of the 3D effects of the objects 310, 320, and 330, respectively, are displayed (FIG. 28 (a)), if the information 430C indicating the 3D effect extent of the second object 320 is dragged to optimize the second object 320 having the excessive 3D effect, the controller 180 is able to optimize the 3D effect of the second object 320 by adjusting the gap between the first and second cameras 121a and 121b to correspond to the dragged distance of the information 430C (FIG. 28 (b) and FIG. 28 (c)).

Having described various approaches to displaying and adjusting extents of 3D effects, an example of storing and further adjusting of a 3D image will be described with reference to FIGS. 29 and 30. For example, if a command for storing the photographed 3D image 300 is inputted, the controller 180 enables each frame of the photographed 3D image 300 and a 3D image file containing the information 400 included in each frame to be stored in the memory 160. In doing so, the controller 180 enables the information 400 displayed within each frame to be stored as meta information. In particular, when the 3D image 300 is recorded, the controller 180 stores the number of frames within the 3D image 400, the number of objects included in each of the frames, and the number of the 3D-effect optimized objects within each of the frames based on the information 400 as the meta information.

The controller 180 determines a 3D photographed state for each of the frames within the 3D image 300. In particular, referring to FIG. 29 (a), the controller 180 determines the 3D photographed state of each of the frames based on the number of the 3D-effect optimized objects within each of the frames of the 3D image 300. For example, if the number of the 3D-effect optimized objects is equal to or greater than a majority, the controller 180 determines the 3D photographed state as an optimal state (e.g., GOOD). For another example, if the number of the 3D-effect optimized objects is smaller than a majority or some other predefined ratio, the controller 180 determines the 3D photographed state as a non-optimized state (e.g., BAD).

Once the controller 180 determines the 3D photographed states of the frames within the 3D image 300, the controller 180 stores the information indicating the 3D photographed states by mapping them to the corresponding frames. The controller 180 averages the 3D photographed states of the frames and then re-determines the 3D photographed state of the whole 3D image 300. For example, first to third frames exist within a first 3D image file 510, since 3D photographed states of the first to third frames are 'GOOD', 'BAD' and 'GOOD', respectively, FIG. 29 (a) shows that the first 3D image file 510 is recorded in an optimized state. A second 3D image file 520 is recorded in a non-optimized state (BAD). And, a third 3D image file 530 is recorded in an optimized state (GOOD).

Thus, if the 3D photographed states of the 3D image files 510, 520 and 530 are determined, respectively, the controller 180 enables the information indicating the 3D photographed state to be included in each of the corresponding 3D image files 510, 520 and 530 and then stores them in the memory 160 (FIG. 29 (b) and FIG. 29 (c)). In particular, FIG. 29 (b) shows that the information 'GOOD', 'BAD' and 'GOOD' indicating the 3D photographed states are displayed within icons indicating the first to third 3D image files are displayed on a 3D image file list, respectively. FIG. 29 (c) shows that the information 'GOOD', 'BAD' and 'GOOD' indicating the 3D photographed states are displayed within names of the first to third 3D image files are displayed on a 3D image file list, respectively.

Figure 30:
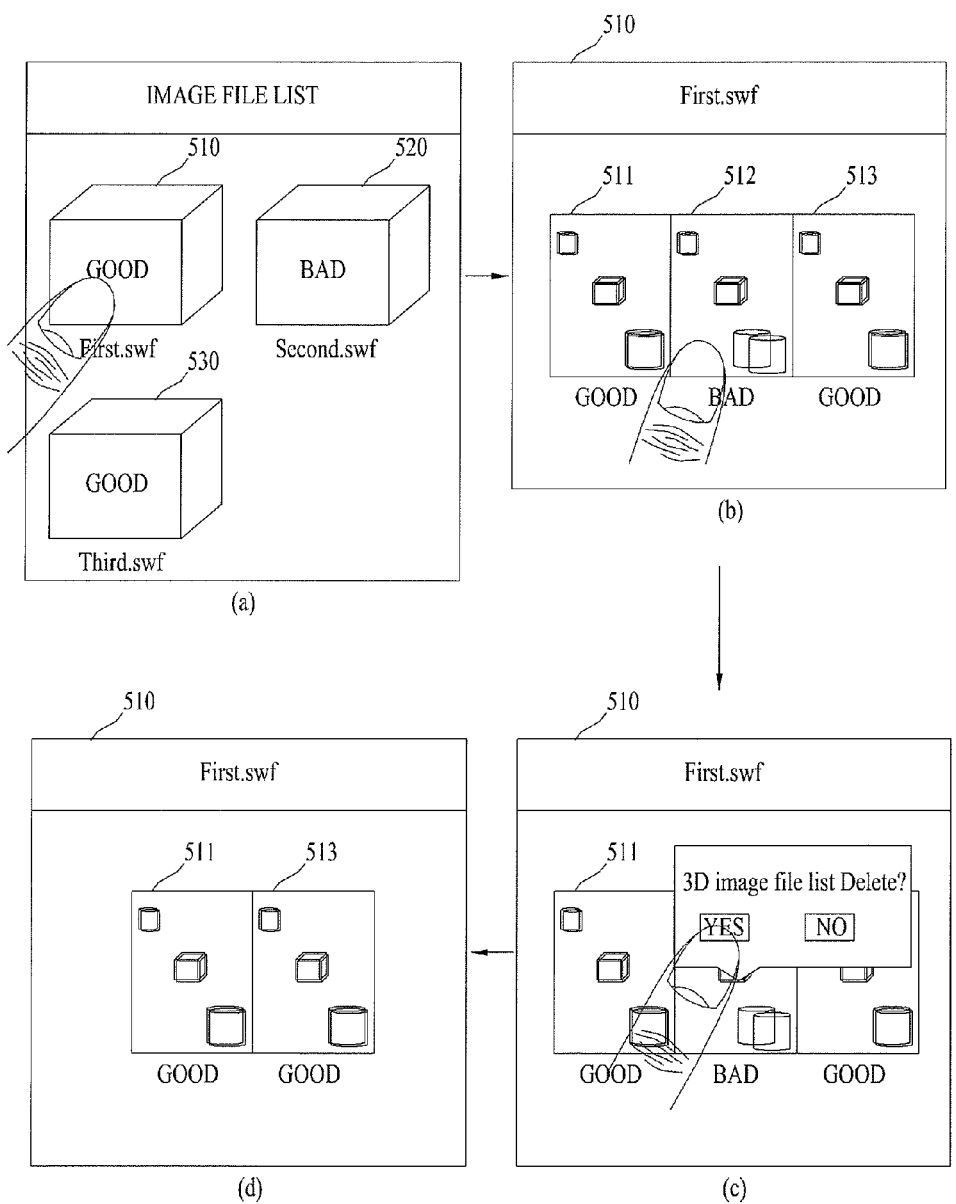

If the specific 3D image file 510 is selected from the 3D image file list, as shown in FIG. 30 (a), the controller 180, as shown in FIG. 30 (b), displays frames 511 to 513 of the selected 3D image file 510. In this exemplary embodiment, the controller 180 further displays the information indicating 3D photographed states of the frames 511 to 513. Each of the frames 511 to 513 is editable according to user's manipulation. In particular, the corresponding editing type can include one of copy, cut, move, delete, separate save, and the like. Namely, if at least one of the frames 511 to 513 is selected, the controller 180 displays an edit function list for the selected at least one frame on the screen of the display unit 151. If a specific editing function is selected from the edit function list, the controller 180 applies the selected edit function to the selected at least one frame. For instance, if the second frame 512, for which the 3D photographed state is not optimized, is selected (FIG. 30 (b)), the controller 180 displays a popup window for querying whether to delete the second frame 512 (FIG. 30 (c)). If a command for deleting the second frame 512 is inputted via the popup window, the second frame 512 is deleted from the first 3D image file 510 [FIG. 30 (d)].

Accordingly, the present invention provides various effects and/or advantages. For example, the present invention indicates an object having an excessive parallax, an object having an optimal 3D effect, and the like within a currently photographed 3D image to a user. Once indicated, the user can obtain guidance to correct a 3D effect of the object having the excessive parallax within the currently photographed 3D image.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a first camera configured to capture a left-eye image for generating a 3D image;
a second camera configured to capture a right-eye image for generating the 3D image;
a display unit configured to display the 3D image generated based on the left-eye image and the right-eye image; and
a controller configured to determine an extent of a 3D effect on at least one object included in the 3D image, and to control the display unit to display information indicating the determined extent of the 3D effect.

2. The mobile terminal of claim 1, wherein the controller displays the information corresponding to the at least one object at a position of the at least one object within the 3D image.

3. The mobile terminal of claim 1, wherein the controller is configured to determine the extent of the 3D effect of the at least one object using a convergence zero point between the first and second cameras and the at least one object within the 3D image as a reference value.

4. The mobile terminal of claim 1, wherein the information indicates at least one of an optimal state of the 3D effect for the at least one object, an excessive state of the 3D effect for the at least one object, and an absence of the 3D effect for the at least one object.

5. The mobile terminal of claim 1, wherein the information is displayed as a guide box at a corresponding position of the at least one object within the 3D image, and wherein the controller indicates the extent of the 3D effect of the at least one object by at least one of changing a color of the guide box and blinking the guide box.

6. The mobile terminal of claim 1, further comprising an audio output unit, wherein the controller controls the audio output unit to output a sound indicating the extent of the 3D effect for the at least one object.

7. The mobile terminal of claim 1, wherein, if the controller determines that the extent of the 3D effect of the at least one object is not optimized, the controller is configured to determine an optimization condition of the 3D effect for the at least one object and to display guide information indicating the determined optimization condition at a position of the at least one object within the 3D image.

8. The mobile terminal of claim 1, wherein if the 3D image includes a plurality of objects and the ratio of objects for which the extents of 3D effects are not optimized compared to the total number of objects of the 3D image is equal to or greater than a preset ratio, the controller switches the 3D image to a 2D image and then displays the 2D image.

9. The mobile terminal of claim 1, further comprising a camera moving unit configured to adjust a gap between the first and second cameras,
wherein, if the controller determines that the extent of the 3D effect of the at least one object is not optimized, the controller is configured to optimize the extent of the 3D effect of the at least one object by controlling the camera moving unit to adjust the gap between the first and second cameras.

10. The mobile terminal of claim 1, further comprising a memory,
wherein, if a storage command for the 3D image is inputted to the controller, the controller controls a 3D image file containing each frame of the photographed 3D image and the information included in each frame to be stored in the memory.

11. A method of controlling a 3D image displayed by a mobile terminal, the method comprising:
capturing a left-eye image by a first camera of the mobile terminal;
capturing a right-eye image by a second camera of the mobile terminal;
generating the 3D image using the left-eye image and the right-eye image;
displaying the generated 3D image;
recognizing an extent of a 3D effect on a first object included in the generated 3D image; and
displaying information indicating the determined extent of the 3D effect.

12. The method of claim 11, wherein determining the extent of the 3D effect includes using a convergence zero point between the first and second cameras and the first object within the 3D image as a reference value.

13. The method of claim 11, further comprising outputting a sound indicating the extent of the 3D effect for the first object.

14. The method of claim 11, wherein, if the 3D image includes the first object and a second object, where the second object has a non-optimized 3D effect, the method further includes:
identifying the second object having the non-optimized 3D effect; and
disassociating the second object from the 3D image.

15. The method of claim 14, wherein disassociating the second object includes:
overlaying the second object with a specific color; or
cutting the second object from the 3D image and replacing the second object by synthesizing a 3D effect from a part of a previous frame of the 3D image having an optimized effect for the second object.

16. The method of claim 11, wherein, if the 3D image includes the first object and a second object, where the second object has a non-optimized 3D effect, the method further includes:
determining an optimization condition for the 3D effect for the second object; and
displaying information indicating the determined optimization condition at a position in the displayed 3D image corresponding to the second object.

17. The method of claim 16, wherein determining the optimization condition includes at least one of identifying a distance between the first and second cameras and the second object and identifying a parallax between the first and second cameras and the second object to generate an optimal 3D effect for the second object.

18. The method of claim 11, wherein the mobile terminal includes a camera moving unit to adjust a distance between the first and second cameras, and the method further includes, if the 3D image includes the first object and a second object having a non-optimized 3D effect, adjusting the distance between the first and second cameras to optimize the 3D effect of the second object.

19. The method of claim 11, wherein the mobile terminal includes a controller and a memory, the method further comprising:
receiving a storage command for the 3D image; and
storing in memory a 3D image file containing each frame of the 3D image and said information from each frame.

20. The method of claim 19, further comprising:
recognizing a state of the 3D image based on the stored information from each frame of the 3D image file;
storing the state of the 3D image in the 3D image file.

21. The method of claim 20, further comprising:
displaying each of the frames of the 3D image file;
recognizing a state for each of the frames of the 3D image file based on the stored information from each frame;
displaying the state of each frame of the 3D image file in the corresponding frame; and
allowing a particular frame to be deleted based on the state of the particular frame.

* * * * *